United States Patent
Heath et al.

(10) Patent No.: US 11,876,398 B1
(45) Date of Patent: Jan. 16, 2024

(54) SYSTEMS, METHODS AND COMPUTER PROGRAM PRODUCTS FOR CHARGING AUTONOMOUS WIRELESS SENSORS IN SUBSURFACE ENVIRONMENTS

(71) Applicants: National Technology & Engineering Solutions of Sandia, LLC, Albuquerque, NM (US); The Board of Regents of the University of Texas System, Austin, TX (US); Wayne State University, Detroit, MI (US)

(72) Inventors: Jason E. Heath, Edgewood, NM (US); Gungor Didem Beskardes, Albuquerque, NM (US); Wallace McAliley, Golden, CO (US); Chester J. Weiss, Sandia Park, NM (US); Mohsen Ahmadian-Tehrani, Austin, TX (US); David T. Chapman, Austin, TX (US); Leela Arava, Detroit, MI (US)

(73) Assignees: National Technology & Engineering Solutions of Sandia, LLC, Albuquerque, NM (US); The Board of Regents of the University of Texas System, Austin, TX (US); Wayne State University, Detroit, MI (US)

( * ) Notice: Subject to any disclaimer, the term of this patent is extended or adjusted under 35 U.S.C. 154(b) by 526 days.

(21) Appl. No.: 16/806,742

(22) Filed: Mar. 2, 2020

Related U.S. Application Data

(60) Provisional application No. 62/812,470, filed on Mar. 1, 2019.

(51) Int. Cl.
*H02J 7/02* (2016.01)
*H02J 50/00* (2016.01)
(Continued)

(52) U.S. Cl.
CPC .............. *H02J 7/02* (2013.01); *E21B 43/267* (2013.01); *E21B 47/06* (2013.01); *E21B 47/07* (2020.05);
(Continued)

(58) Field of Classification Search
CPC . H02J 7/02; H02J 50/001; H02J 50/80; E21B 43/267; E21B 47/06; E21B 47/07;
(Continued)

(56) References Cited

U.S. PATENT DOCUMENTS

| 2012/0024050 A1* | 2/2012 | Godager ................. E21B 47/10 |
| | | 73/152.05 |
| 2015/0021016 A1* | 1/2015 | Deng .................... E21B 19/165 |
| | | 166/250.01 |

(Continued)

FOREIGN PATENT DOCUMENTS

WO   WO-2013184676 A1 * 12/2013 ............. E21B 17/01

OTHER PUBLICATIONS

H. Guo and Z. Sun, "Channel and Energy Modeling for Self-Contained Wireless Sensor Networks in Oil Reservoirs," in IEEE Transactions on Wireless Communications, vol. 13, No. 4, pp. 2258-2269, Apr. 2014, doi: 10.1109/TWC.2013.031314.130835. (Year: 2014).*

Alshehri, A. A. et al., "Optimal Energy Planning for Wireless Self-Contained Sensor Networks in Oil Reservoirs," IEEE ICC 2017 Ad-Hoc and Sensor Networking Symposium, May 21-25, Paris, France, 7 pages.
(Continued)

*Primary Examiner* — Rebecca C Bryant
*Assistant Examiner* — Christopher J Gassen
(74) *Attorney, Agent, or Firm* — Daniel J. Jenkins

(57) ABSTRACT

Autonomous wireless sensors in subsurface environments can be charged while present in the subsurface environment to allow the sensors to measure and wirelessly transmit measurements. The sensors rely upon a contrast agent to provide a power flow path to the sensors.

11 Claims, 19 Drawing Sheets

(51) Int. Cl.
  *H02J 50/80* (2016.01)
  *G01D 21/02* (2006.01)
  *E21B 43/267* (2006.01)
  *E21B 47/07* (2012.01)
  *E21B 49/08* (2006.01)
  *E21B 47/13* (2012.01)
  *E21B 49/00* (2006.01)
  *E21B 47/06* (2012.01)

(52) U.S. Cl.
  CPC .............. *E21B 47/13* (2020.05); *E21B 49/00* (2013.01); *E21B 49/0875* (2020.05); *G01D 21/02* (2013.01); *H02J 50/001* (2020.01); *H02J 50/80* (2016.02); *E21B 2200/20* (2020.05)

(58) Field of Classification Search
  CPC ...... E21B 47/13; E21B 49/00; E21B 49/0875; E21B 2200/20; G01D 21/02
  See application file for complete search history.

(56) References Cited

U.S. PATENT DOCUMENTS

| | | | |
|---|---|---|---|
| 2015/0268373 A1* | 9/2015 | Meyer | G01R 33/032 324/324 |
| 2016/0047933 A1* | 2/2016 | Bartel | G01V 3/30 324/338 |
| 2019/0040311 A1* | 2/2019 | Nguyen | C09K 8/80 |
| 2019/0273973 A1* | 9/2019 | Sassi | E21B 47/06 |

OTHER PUBLICATIONS

Guo, H. et al., "Channel and Energy Modeling for Self-Contained Wireless Sensor Networks in Oil Reservoirs," IEEE Transactions on Wireless Communications (2014) 13(4):2258-.

Martins, C. H. et al., "Novel MI-based (FracBot) Sensor Hardware Design for Monitoring Hydraulic Fractures and Oil Reservoirs," 2017 IEEE 8th Annual Ubiquitous Computing, Electronics and Mobile Communication Conference (UEMCON), Oct. 19-21, New York, NY, pp. 434-441.

* cited by examiner min: 1.8e-15
max: 1.83e-3 min: 1.8e-15
max: 3.73e-3 min: 1.8e-15
max: 5.96e-3

0.5R min: 1.8e-15
max: 3.12e-3

R min: 1.8e-15
max: 3.73e-3

2R $|E|^2 : V^2/m^2$ 0.0001000

7.500e-05

5.000e-05

2.500e-05

1.796e-15 min: 1.8e-15
max: 2.85e-3 min: 1.8e-15
max: 4.03e-3 min: 1.8e-15
max: 7.68e-3

SYSTEMS, METHODS AND COMPUTER PROGRAM PRODUCTS FOR CHARGING AUTONOMOUS WIRELESS SENSORS IN SUBSURFACE ENVIRONMENTS

CROSS-REFERENCE TO RELATED APPLICATIONS

This application claims priority to U.S. Provisional Patent Application No. 62/812,470, filed on Mar. 1, 2019, entitled "SYSTEMS, METHODS AND COMPUTER PROGRAM PRODUCTS FOR CHARGING AUTONOMOUS WIRELESS SENSORS IN SUBSURFACE ENVIRONMENTS," the entirety of which is incorporated herein by reference.

STATEMENT OF GOVERNMENT INTEREST

The United States Government has rights in this invention pursuant to Contract No. DE-NA-0003525 between the United States Department of Energy and Energy Solutions of Sandia Corporation, L.L.C., for the operation of the Sandia National Laboratories.

BRIEF DESCRIPTION OF THE SEVERAL VIEWS OF THE DRAWING

The patent or application file contains at least one drawing executed in color. Copies of this patent or patent application publication with color drawing(s) will be provided by the Office upon request and payment of the necessary fee.

FIELD

Figure 1:
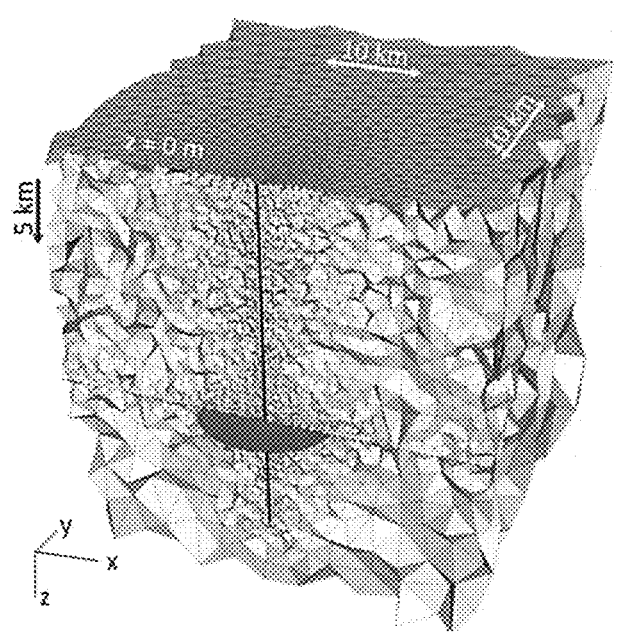

The present disclosure is generally directed to subterranean characterization, and more directed to the enablement of remote charging autonomous wireless microsensors in subsurface environments.

BACKGROUND

In both conventional and tight unconventional oil and gas reservoirs, monitoring reservoir's physicochemical conditions is key to optimizing reservoir performance. However, reliable long-term reservoir monitoring requires a combination of existing monitoring methods as well as the integration of multiple types of observations. Existing monitoring is often intrusive to production. Furthermore, current monitoring methods cannot provide long-term, high resolution, in situ measurements inside subterranean fractures, and when autonomous microsensors are embedded in cemented well annulus and subterranean reservoirs and when microsensors are emplaced in confined spaces in a distributed manner.

A need remains for systems, methods, materials and computer program products that enable remote charging of embedded microsensors to provide for long-term, unobtrusive and high resolution subsurface monitoring.

SUMMARY OF THE DISCLOSURE

According to an embodiment of the disclosure, a system is disclosed that includes one or more contrast agents and a plurality of autonomous microsensors disposed within a subterranean formation, a control unit that includes a power source to energize the plurality of autonomous microsensors and contrast agent(s), and one or more receivers for receiving information transmitted from one or more of the plurality of autonomous microsensors.

According to another embodiment of the disclosure, a method is disclosed that includes disposing a plurality of microsensors in a subterranean formation wirelessly energizing the plurality of microsensors, sensing one or more physicochemical states by the plurality of microsensors, transmitting data of the physicochemical states from the plurality of microsensors to a receiver, and analyzing the transmitted data.

According to another embodiment of the disclosure, a method to perform subterranean characterization is disclosed that includes determining the amount of power necessary to power a plurality of microsensors disposed within a subterranean formation in the presence of a contrast agent, disposing the microsensors and contrast agent within the subterranean formation, energizing the microsensors to enable the microsensors to measure one or more physicochemical states and further transmit the measurements, receiving the transmitted measurements, and analyzing the received measurements to compile the measurements obtained from the subterranean formation.

The present disclosure provides for sensor systems and deployment strategies for power harvesting and remote charging of embedded microelectronic sensors in the presence of engineered components and other clutter such as the wellbore and engineered or natural geologic features whose Electromagnetic (EM) properties are modified though the emplacement of one or more engineered or natural electromagnetic contrast agent (media-modifying EM materials, modifiers or EM additives). In this context, an EM contrast agent is an emplaced solid, liquid, or gaseous material that has values of conductivity, permittivity, and permeability that are distinguishable from that of the host rock, and which can enable transmission of EM energy.

The present disclosure further provides for methods and deployment strategies for power harvesting and remote charging of embedded sensors by quantifying the available electrical energy of engineered subsurface environments in the presence of engineered components and other clutter such as the wellbore and engineered or natural geologic features whose electrical conductivity is modified though the emplacement of an engineered or natural contrast agent.

The present disclosure is further directed to system that includes an arrangement that uses a transmitter for electromagnetically energizing EM contrast agents (EM additives and/or EM proppant) using direct current (DC) mode or pulsed DC mode.

The present disclosure is further directed to system that includes an arrangement that uses a transmitter for electromagnetically energizing EM contrast agents (EM additives and/or EM proppant) using alternating current (AC) mode or quasi-static AC mode.

The present disclosure is further directed to a process that includes determining the spatial distribution of power density in a subsurface engineered environment to inform power harvesting designs and deployment of wireless autonomous sensors.

The present disclosure is further directed to a process that includes determining the spatial distribution of power density in a subsurface engineered environment to inform power harvesting designs and deployment of wireless autonomous sensors and EM contrast agents or EM additives or EM proppant to energize wireless autonomous sensors.

The present disclosure is further a computer program product including a finite element model of a large space that characterizes conductive infrastructure and clutter comprising wellbore and fractures with EM contrast agents, EM additives and/or EM proppant in terms of their material properties.

The present disclosure is further directed to a process that includes determining the spatial distribution of power density in a subsurface engineered environment to inform power harvesting designs and deployment of wireless autonomous sensors.

The present disclosure is further a computer program product including a finite element model of a large space that characterizes conductive infrastructure and clutter comprising wellbore and fractures with contrast agents in terms of material properties.

BRIEF DESCRIPTION OF FIGURES

FIG. 1 shows detail of the tetrahedral mesh at the wellbore according to an embodiment of the disclosure.

Figure 2A:
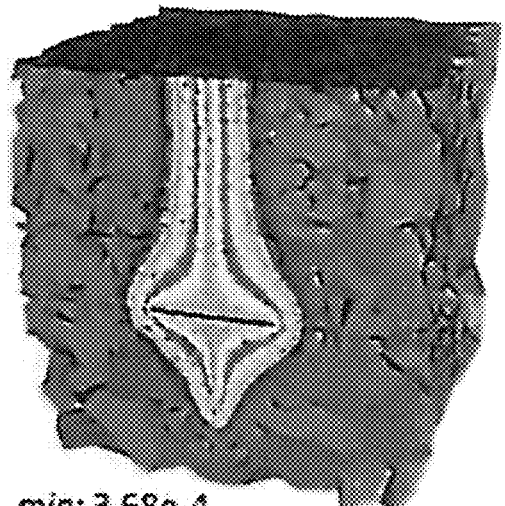

FIG. 2A shows a cross-sectional view of the scalar electric for a conductivity contrast between the fracture and the host rock according to an embodiment of the disclosure.

Figure 2B:
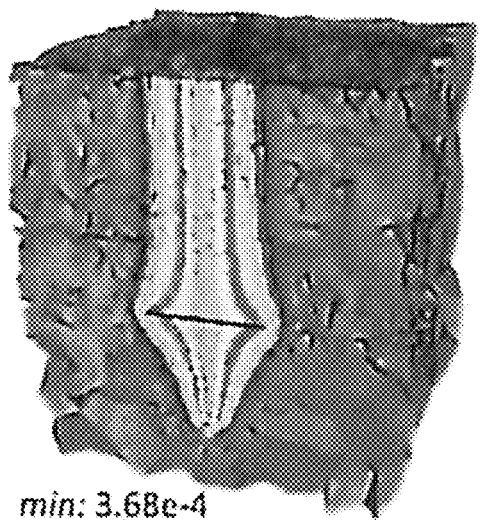

FIG. 2B shows a cross-sectional view of a scalar electric for a different conductivity contrast between the fracture and the host rock according to an embodiment of the disclosure.

Figure 2C:
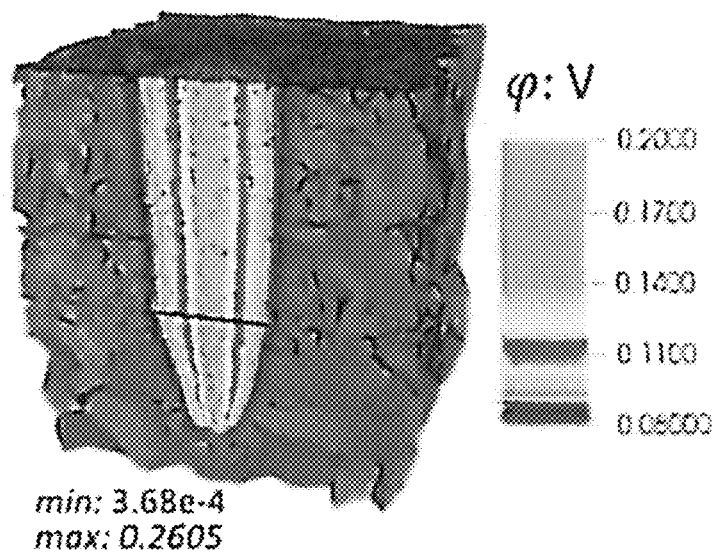

FIG. 2C shows a cross-sectional view of the scalar electric for a conductivity contrast between the fracture and the host rock according to an embodiment of the disclosure.

Figure 2D:
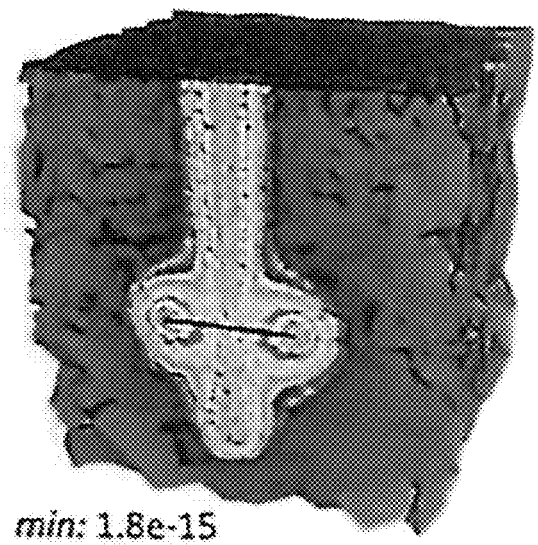

FIG. 2D shows a cross-sectional view of the square of the magnitude of the electric field for a conductivity contrast between the fracture and the host rock according to an embodiment of the disclosure.

Figure 2E:
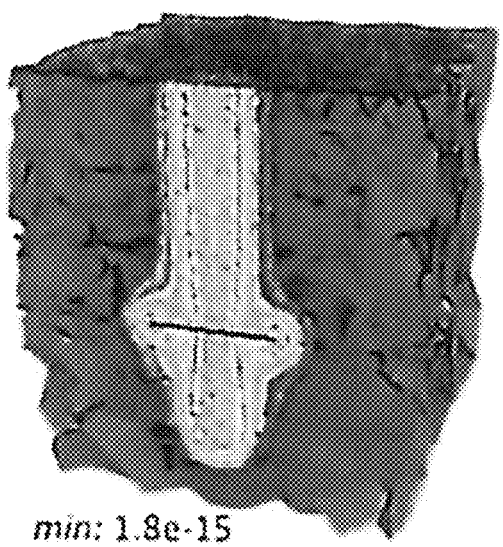

FIG. 2E shows a cross-sectional view of the square of the magnitude of the electric field for conductivity contrast between the fracture and the host rock according to an embodiment of the disclosure.

Figure 2F:
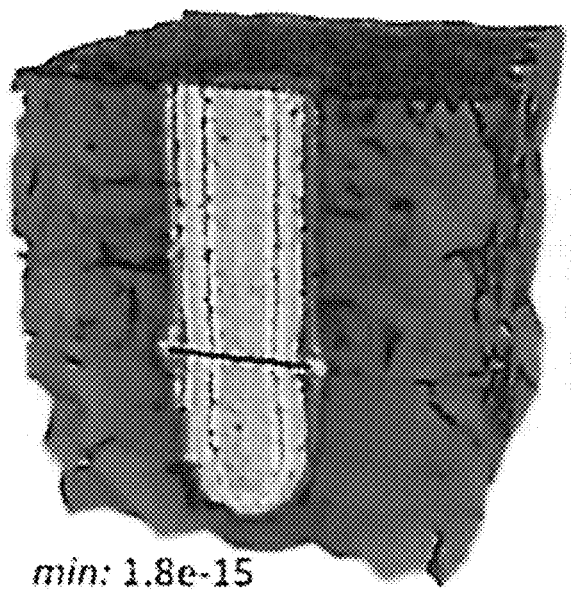

FIG. 2F shows a cross-sectional view of the square of the magnitude of the electric field for conductivity contrast between the fracture and the host rock according to an embodiment of the disclosure.

Figure 3A:
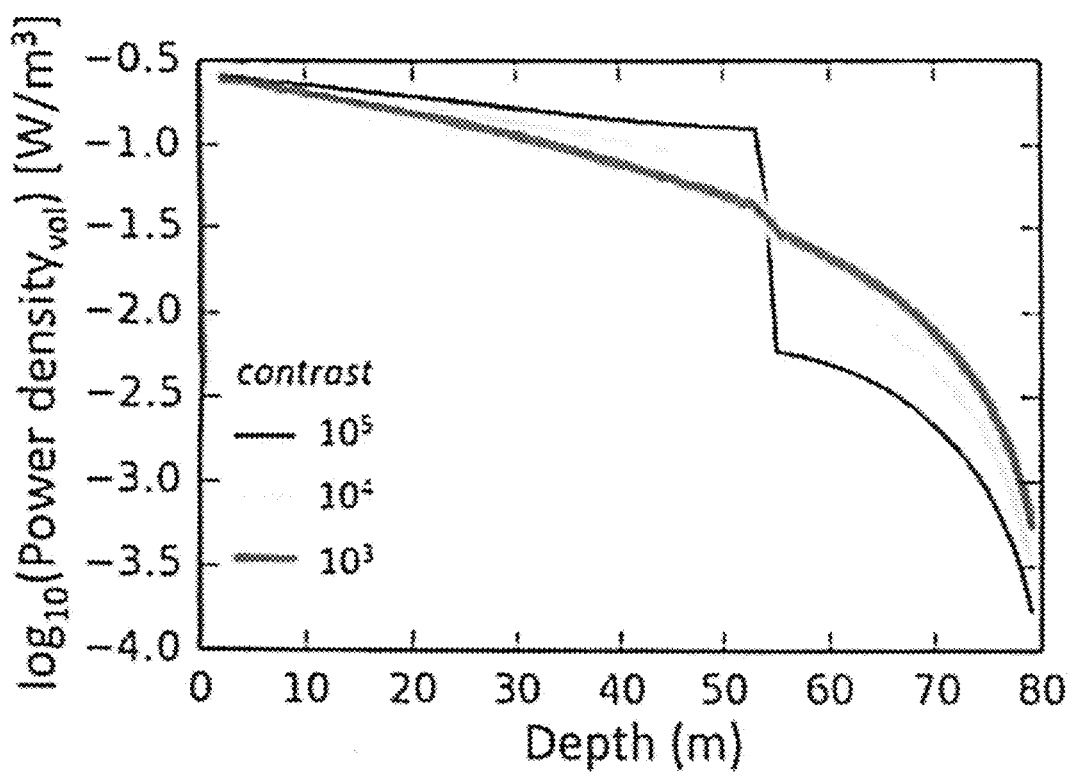

FIG. 3A shows the volumetric power density for different fracture conductivity contrasts with the host rock (a) along the wellbore.

Figure 3B:
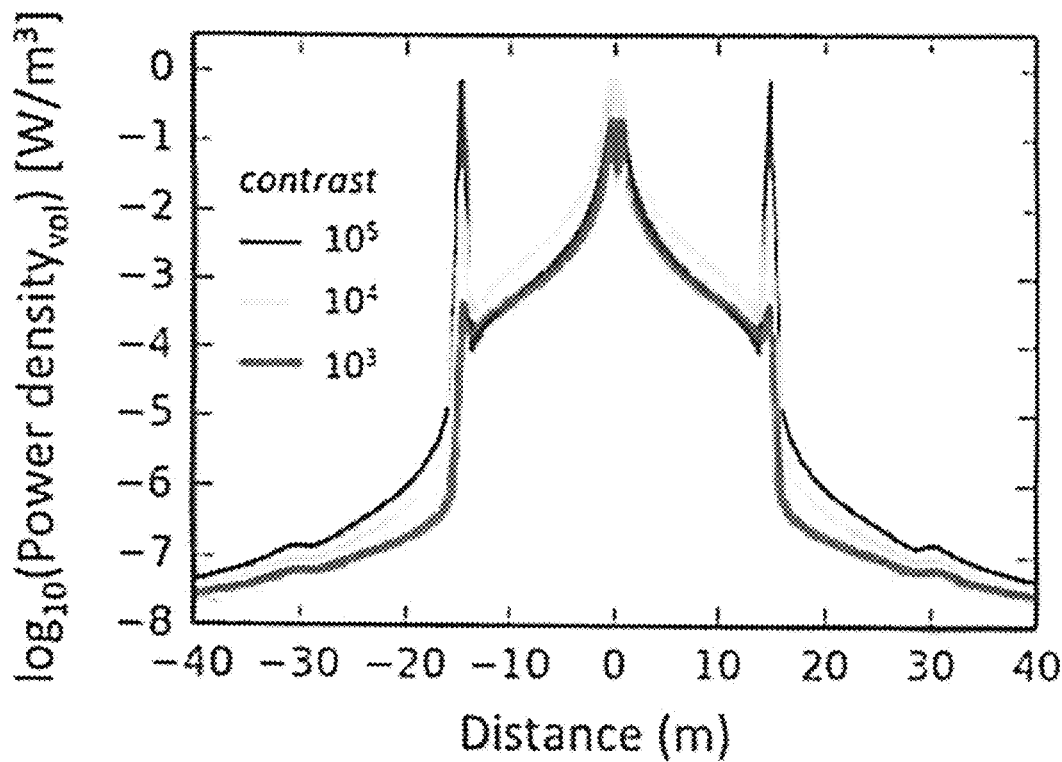

FIG. 3B shows the volumetric power density for different fracture conductivity contrasts with the host rock along the major axis of the fracture, which is 29.6 m.

Figure 4A:
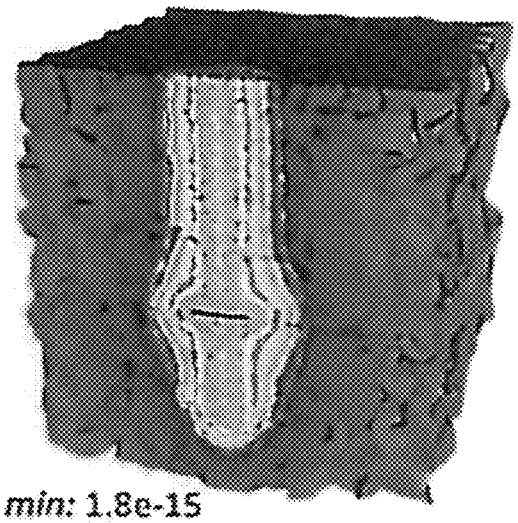

FIG. 4A shows ross-sectional views of $|E|^2$ for a fracture with major and minor axes that are half the size of the base case.

Figure 4B:
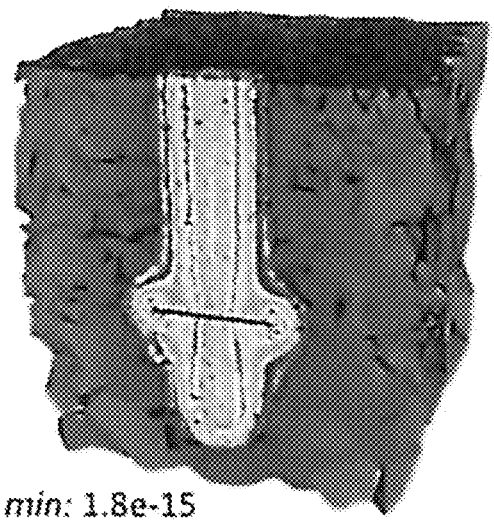

FIG. 4B shows ross-sectional views of $|E|^2$ for a base case fracture size.

Figure 4C:
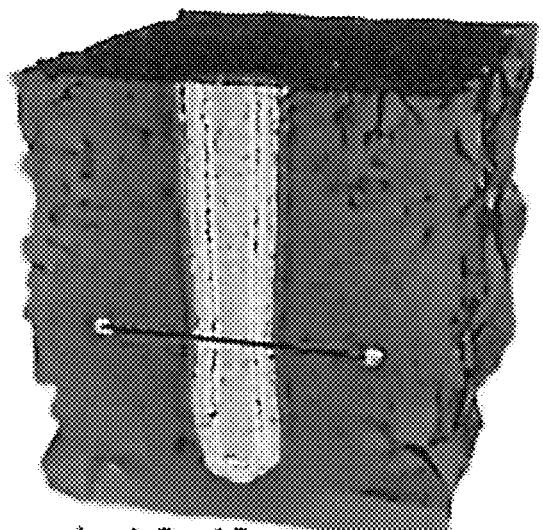
Figure 4C:
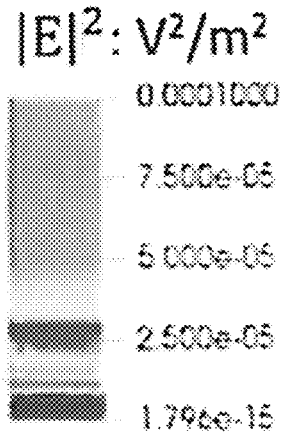
Figure 5A:
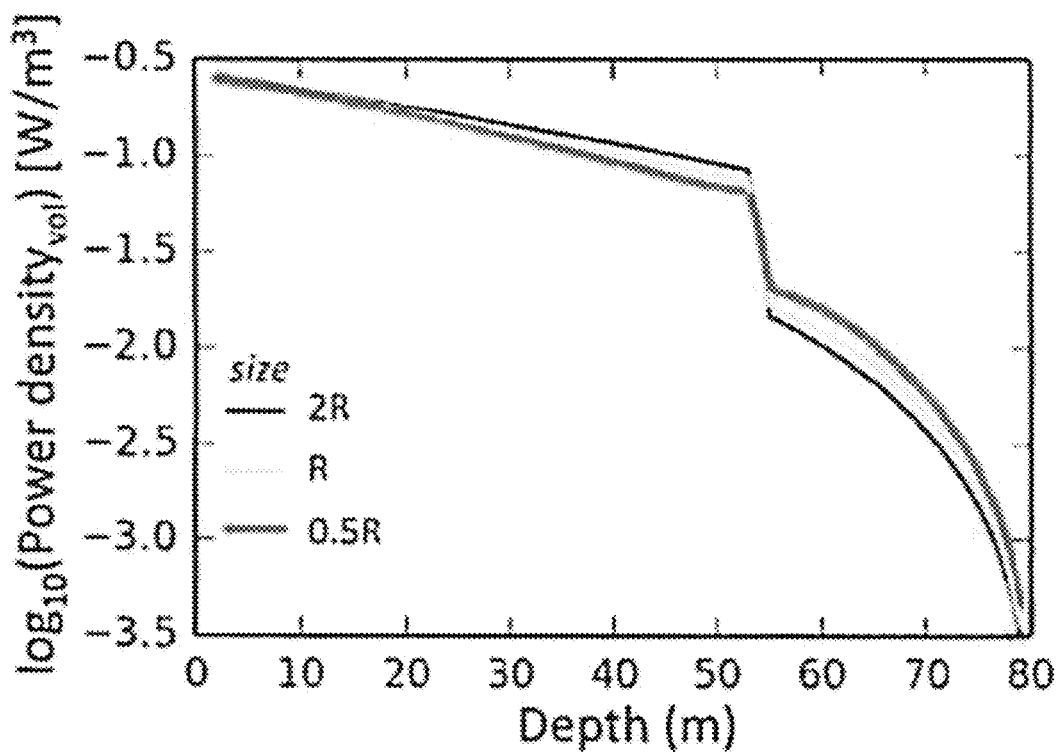

FIG. 4C shows ross-sectional views of $|E|^2$ for a fracture with major and minor axes that are twice the size of the base case FIG. 5A shows volumetric power density profiles for different fracture sizes with power density along the wellbore.

Figure 5B:
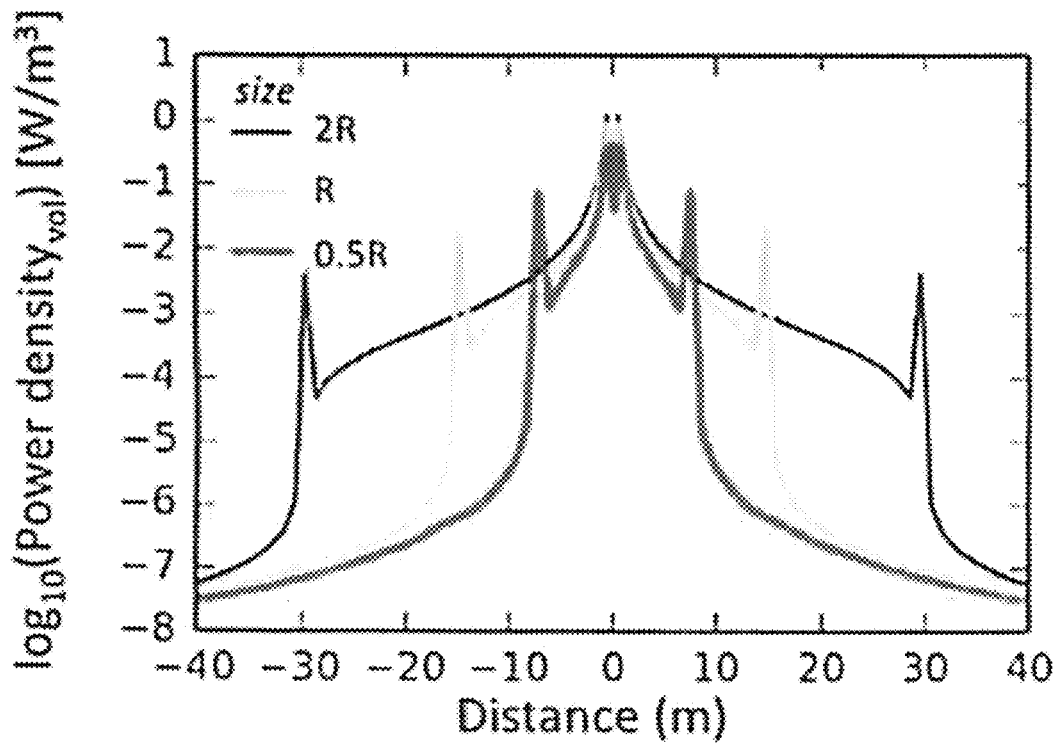

FIG. 5B shows volumetric power density profiles for different fracture sizes with power density along the major axis of each fracture.

Figure 6A:
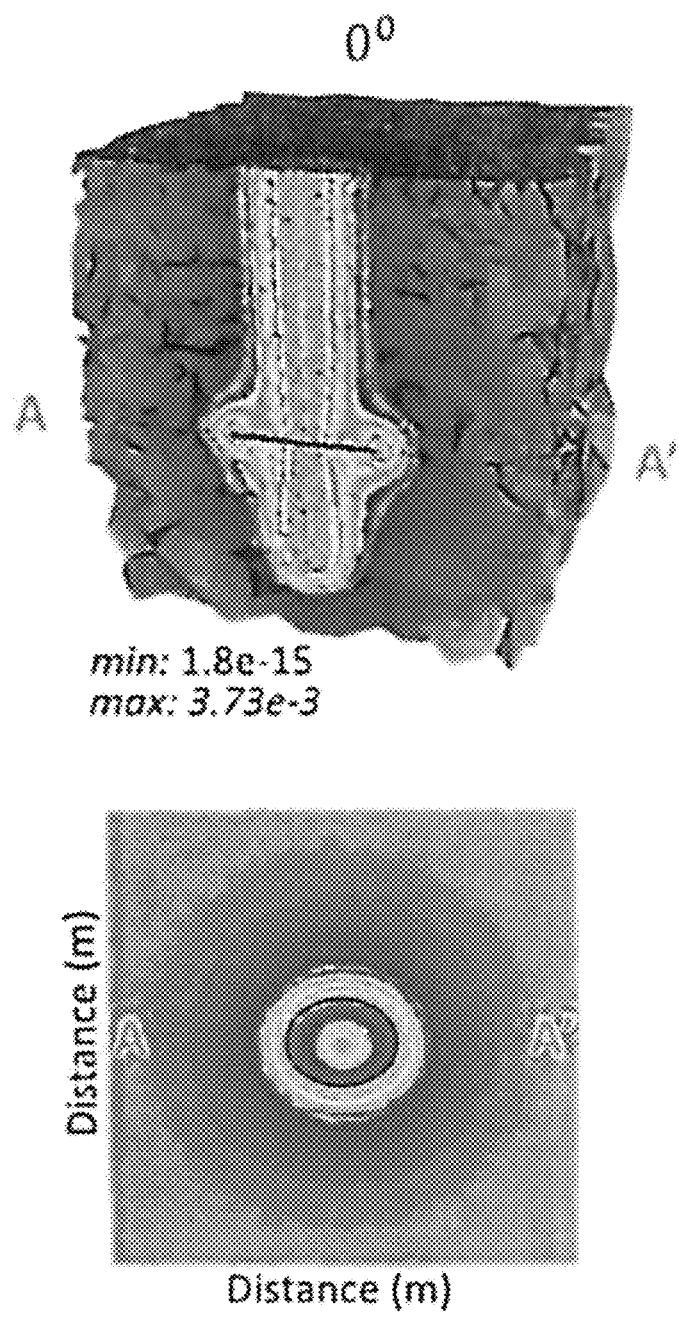

FIG. 6A shows cross-sectional views and slices of $|E|^2$ for a horizontal fracture. The size of each volume is 100 m³. The bold black line in each plot represents the cross-section of each fracture. The bottom panels show the corresponding slices taken in the plane of the fracture. A and A' in each cross-section matches A and A' in the corresponding plan view. The fracture is outlined in these slices (in black). Each slice view is centered on the wellbore and extends 60 m away from it in each direction.

Figure 6B:
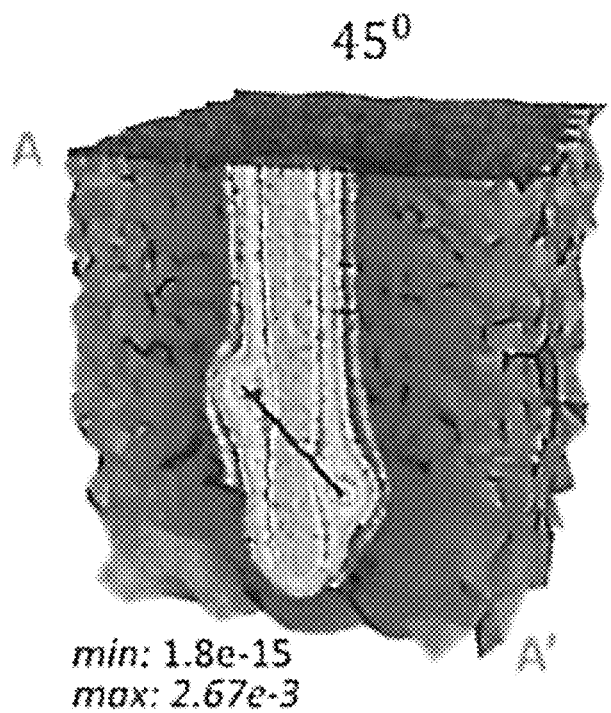
Figure 6B:
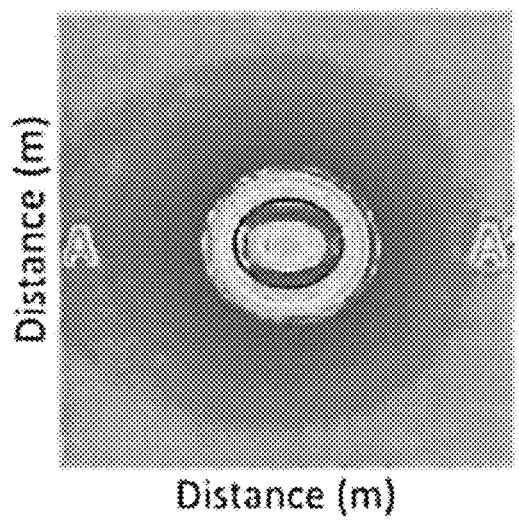

FIG. 6B shows cross-sectional views and slices of $|E|^2$ for a fracture plane at a 45° angle with horizontal. The size of each volume is 100 m³. The bold black line in each plot represents the cross-section of each fracture. The bottom panels show the corresponding slices taken in the plane of the fracture. A and A' in each cross-section matches A and A' in the corresponding plan view. The fracture is outlined in these slices (in black). Each slice view is centered on the wellbore and extends 60 m away from it in each direction.

Figure 6C:
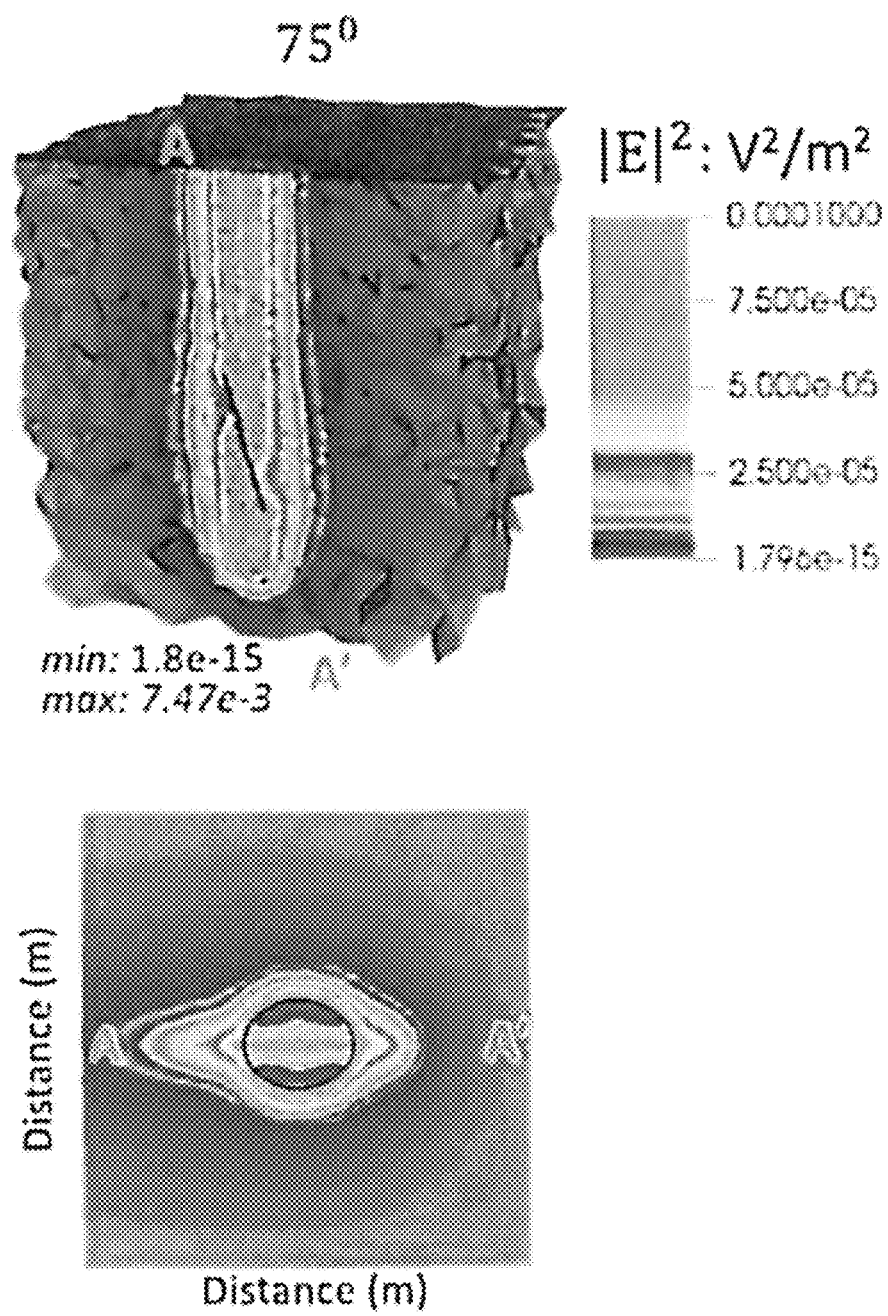

FIG. 6C shows cross-sectional views and slices of $|E|^2$ for a (b) a fracture plane at a 75° angle with horizontal. The size of each volume is 100 m³. The bold black line in each plot represents the cross-section of each fracture. The bottom panels show the corresponding slices taken in the plane of the fracture. A and A' in each cross-section matches A and A' in the corresponding plan view. The fracture is outlined in these slices (in black). Each slice view is centered on the wellbore and extends 60 m away from it in each direction.

Figure 7A:
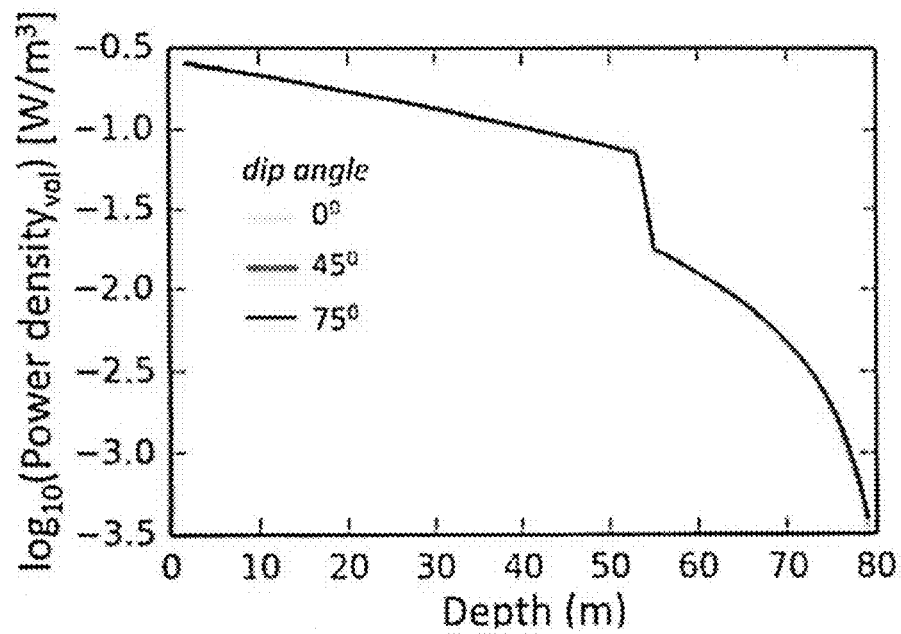

FIG. 7A shows volumetric power density profiles for varying fracture dip angle along the wellbore.

Figure 7B:
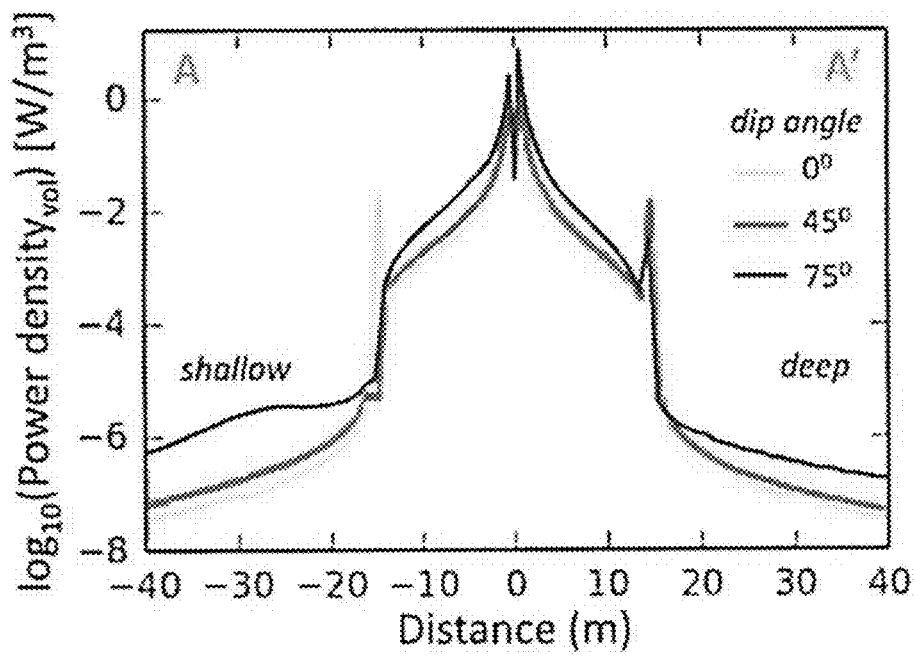

FIG. 7B shows volumetric power density profiles for varying fracture dip angle along the major axis of each fracture.

Figure 8:
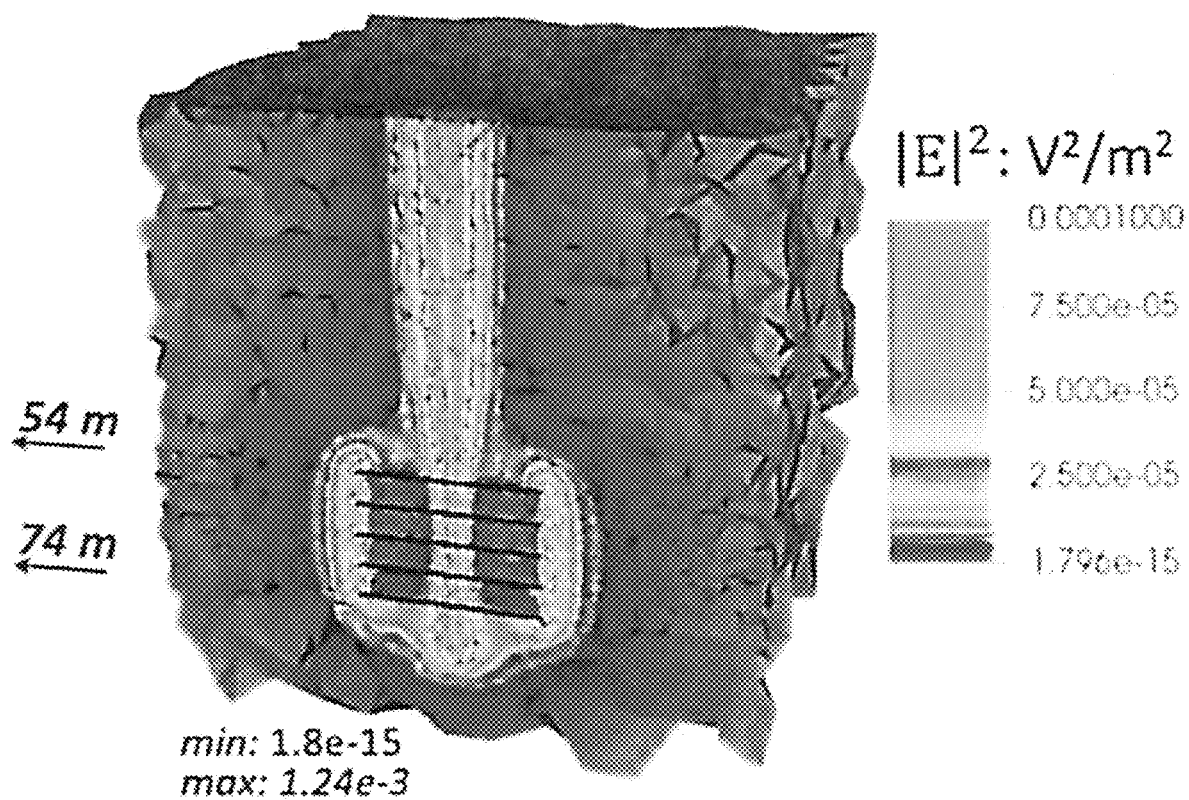

FIG. 8 shows cross-sectional view of $|E|^2$ in the presence of five regularly-spaced fractures. A 100 m3 volume is shown. Horizontal black lines with 5 m spacing represent cross-sections of equally-sized fracture ellipses. The DC current source is at the well head, as in FIG. 1.

Figure 9A:
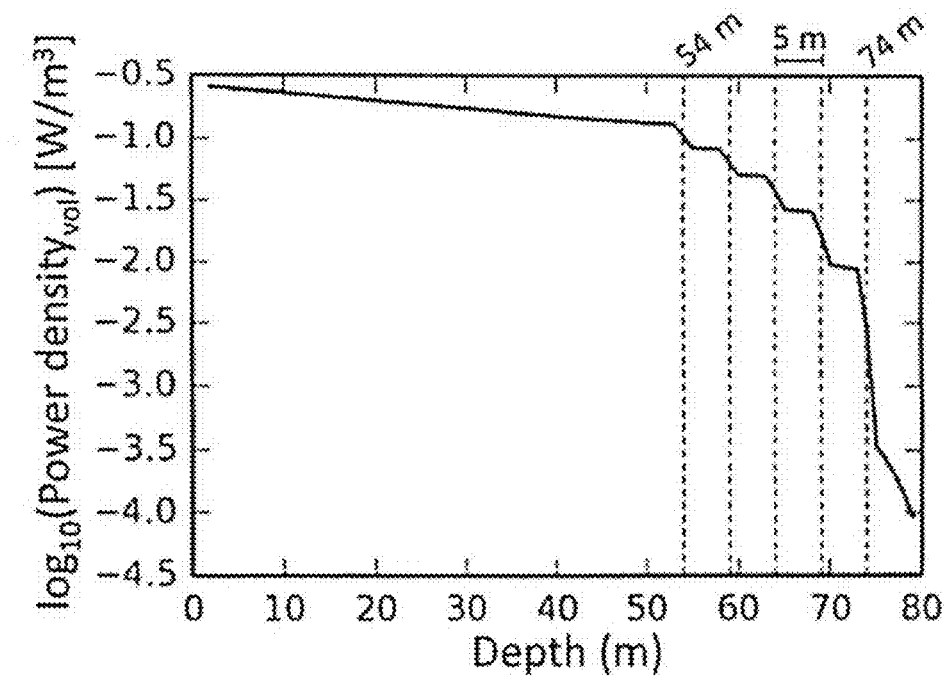

FIG. 9A shows profiles of volumetric power density in the presence of regularly spaced fractures along the wellbore.

Figure 9B:
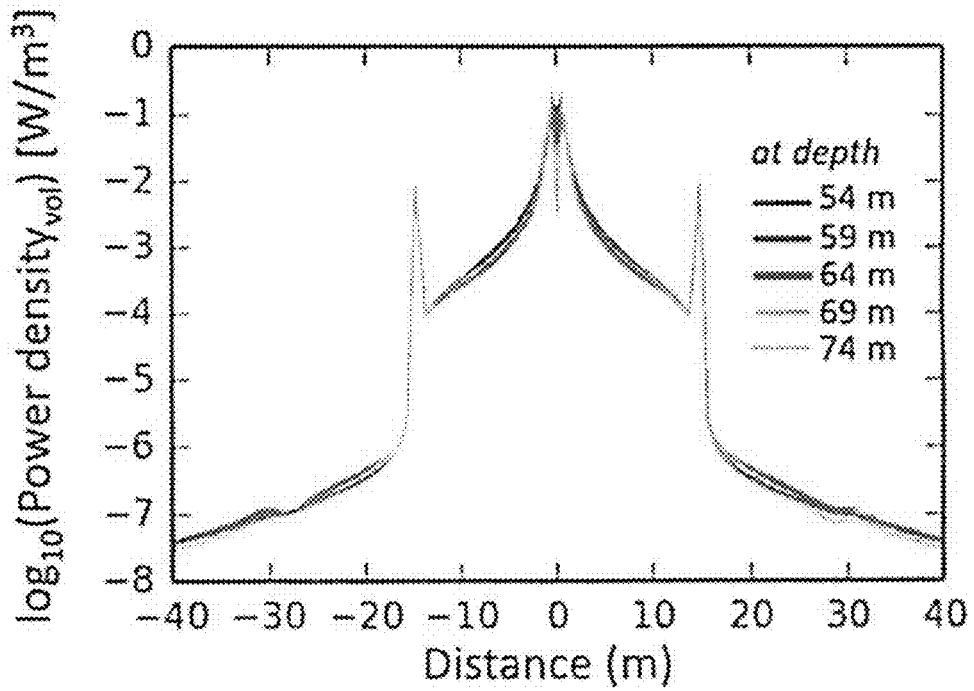

FIG. 9B shows profiles of volumetric power density in the presence of regularly spaced fractures along the major axis of each fracture.

Figure 10A:
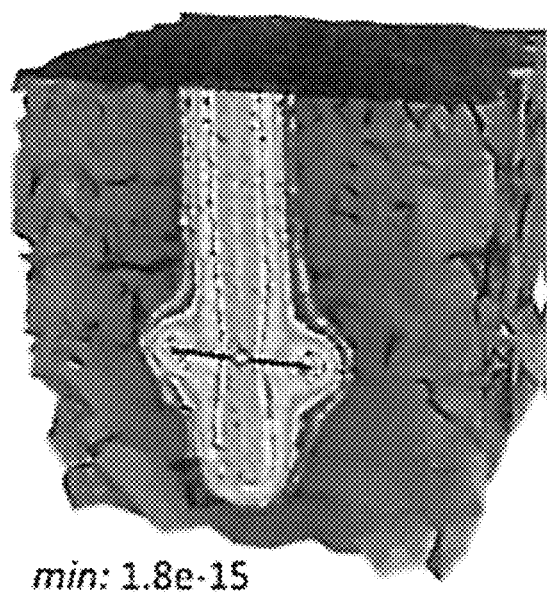
Figure 10A:
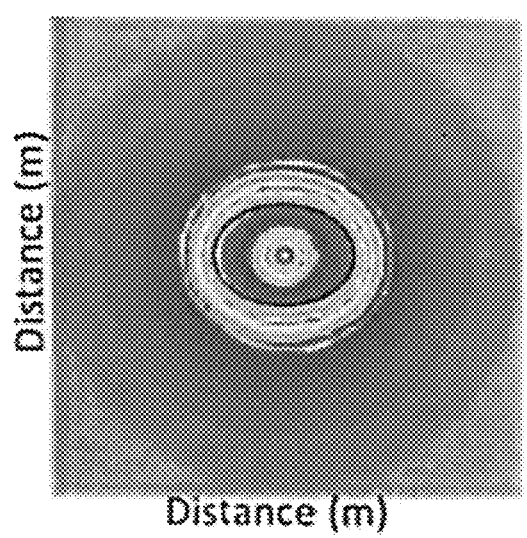

FIG. 10A shows cross-sectional views and plan views of $|E|^2$ when the source is at the depth of the fracture, located in the borehole. The source is denoted by a white dot. Every view remains centered on the wellbore. In cross-sectional views, horizontal black lines denote cross-sections of the fracture. The bottom panels show the corresponding plan views at the fracture depth where the fracture is outlined in black.

Figure 10B:
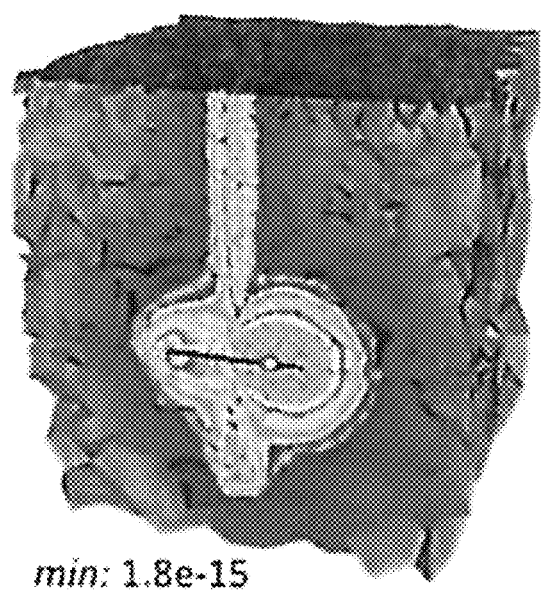
Figure 10B:
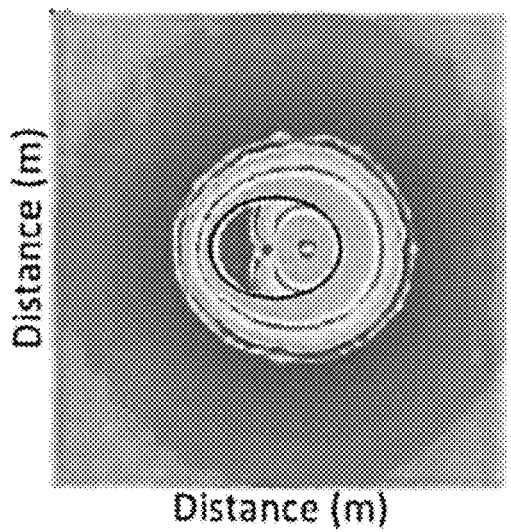

FIG. 10B shows cross-sectional views and plan views of $|E|^2$ when the source is at the depth of the fracture, located midway between borehole and the fracture tip. The source is denoted by a white dot. Every view remains centered on the wellbore. In cross-sectional views, horizontal black lines denote cross-sections of the fracture. The bottom panels show the corresponding plan views at the fracture depth where the fracture is outlined in black.

Figure 10C:
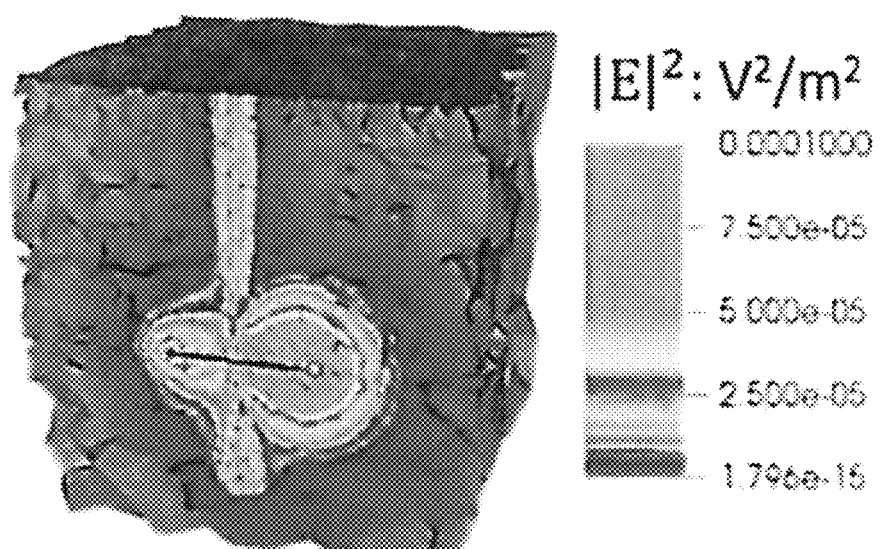
Figure 10C:
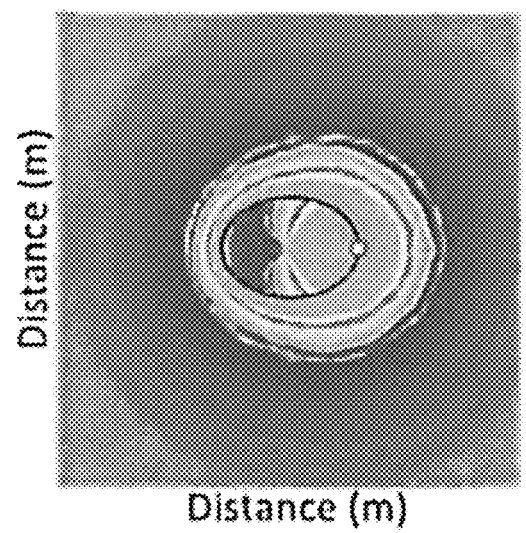

FIG. 10C shows cross-sectional views and plan views of $|E|^2$ when the source is at the depth of the fracture, located at fracture tip. The source is denoted by a white dot. Every view remains centered on the wellbore. In cross-sectional views, horizontal black lines denote cross-sections of the fracture. The bottom panels show the corresponding plan views at the fracture depth where the fracture is outlined in black.

Figure 11A:
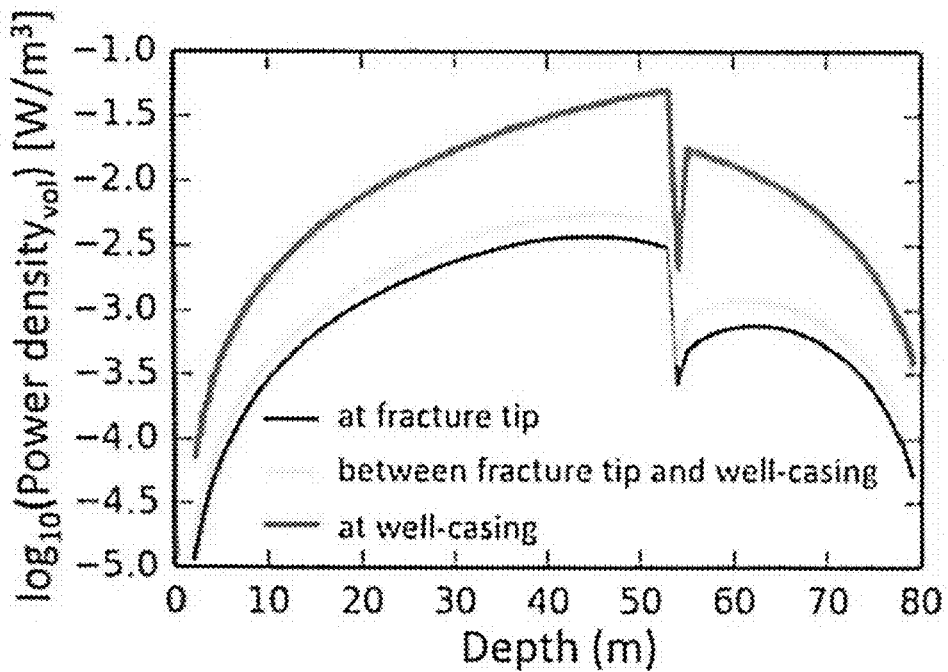

FIG. 11A shows profiles of volumetric power density for source locations at the fracture depth along the wellbore.

Figure 11B:
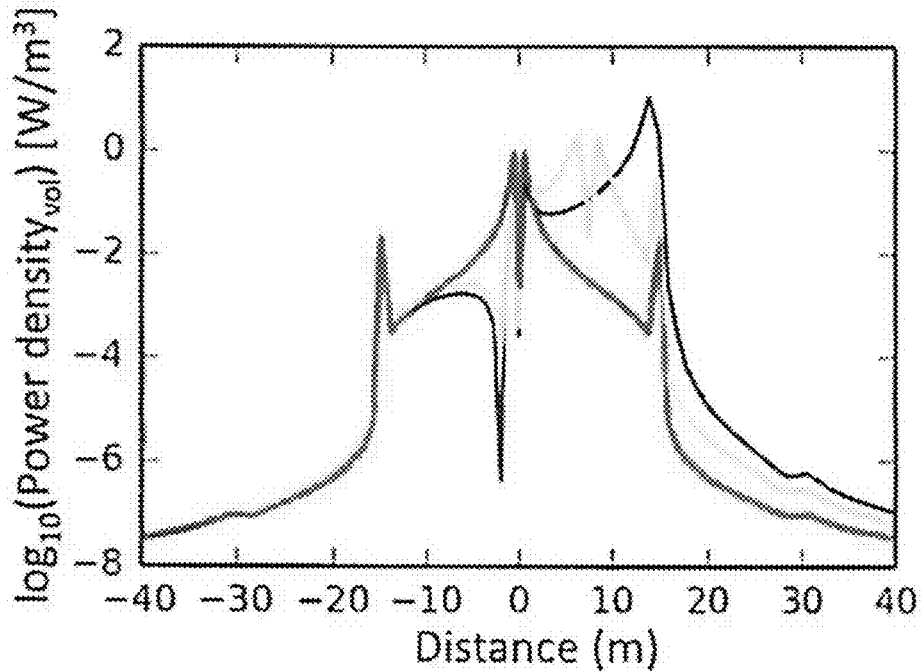

FIG. 11B shows profiles of volumetric power density for source locations at the fracture depth along the fracture's major axis.

Figure 12:
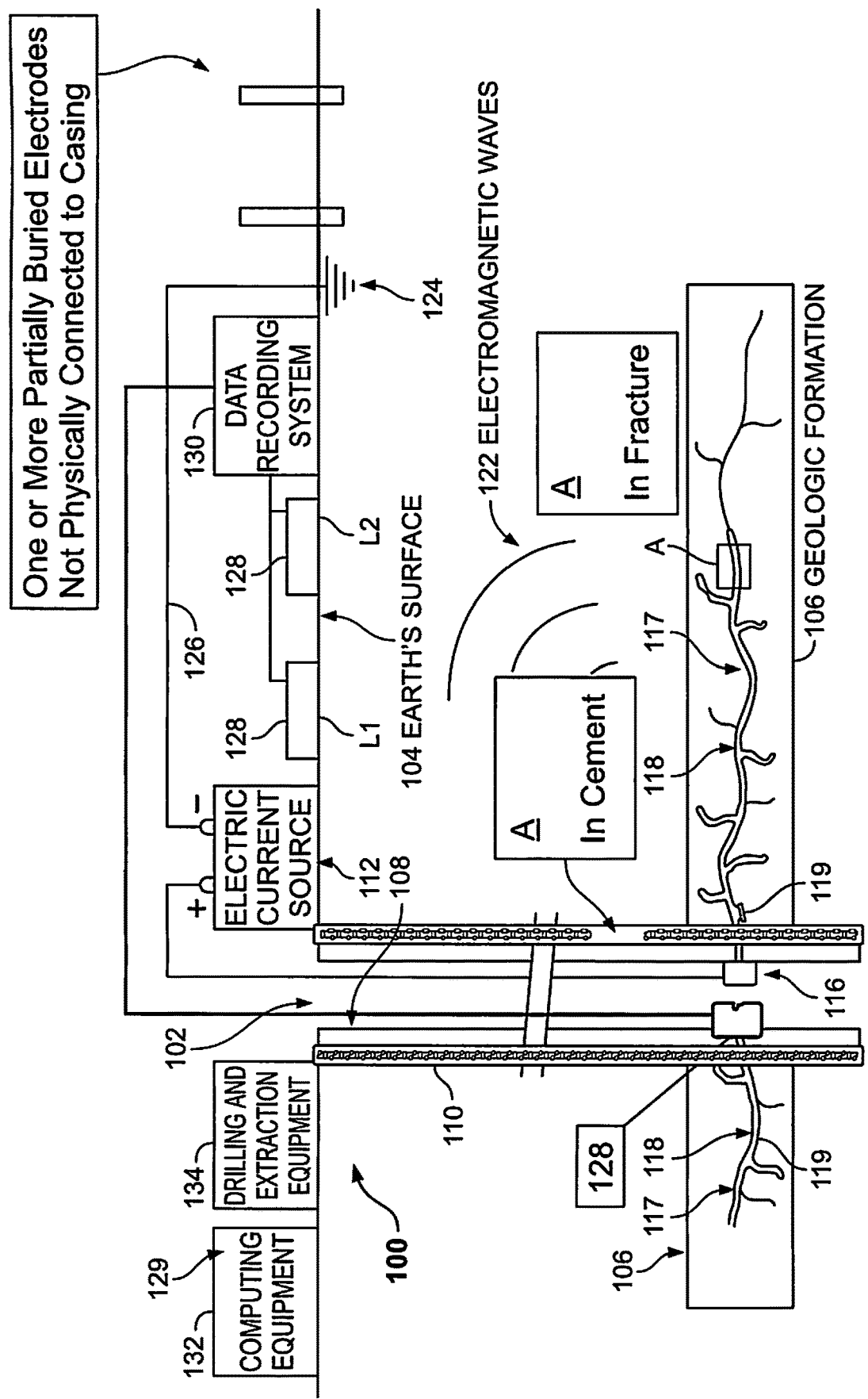

FIG. 12 illustrates a sensing system for a subterranean formation according to one or more embodiments of the disclosure.

Figure 13:
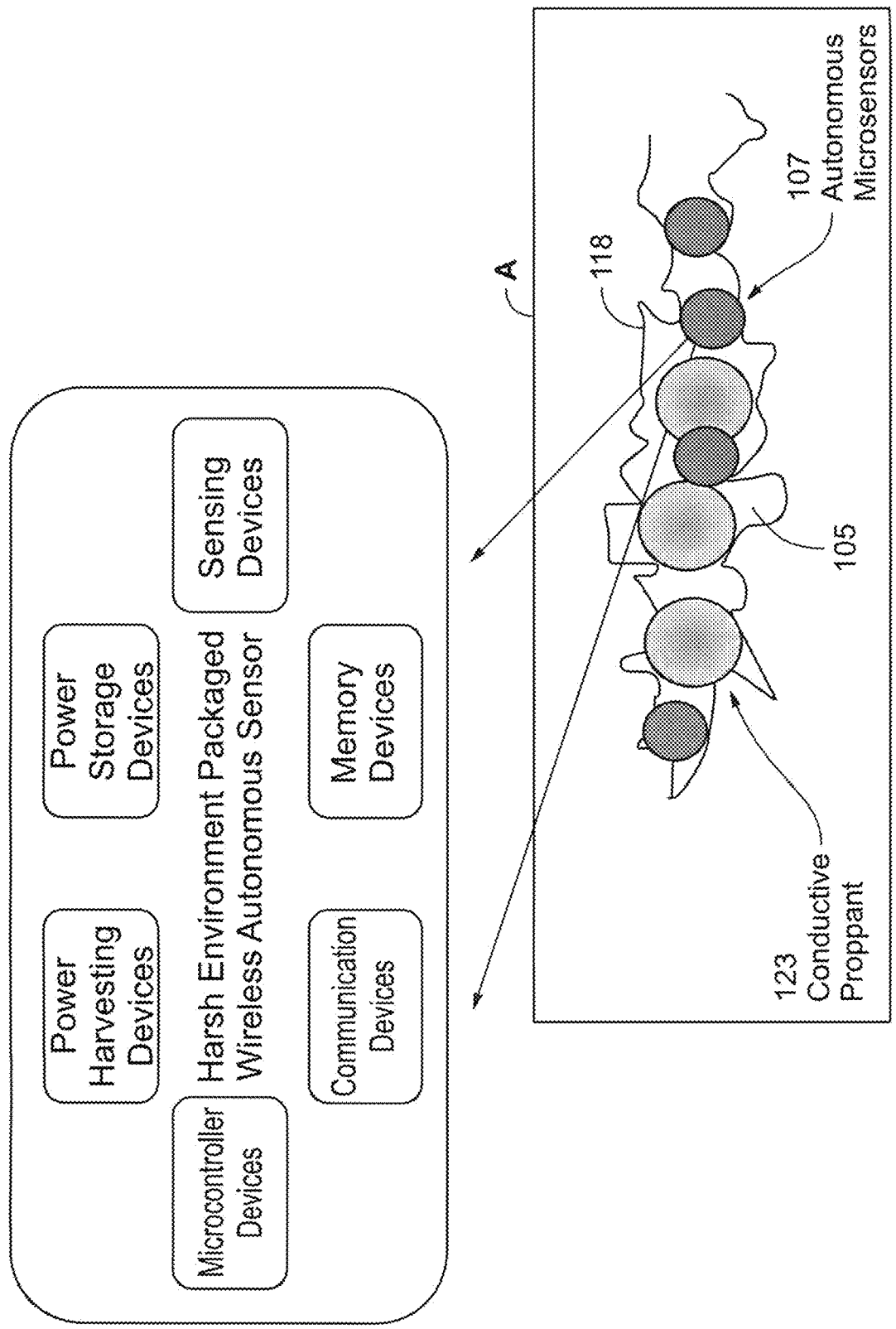

FIG. 13 shows details of section A of FIG. 12.

Figure 14:
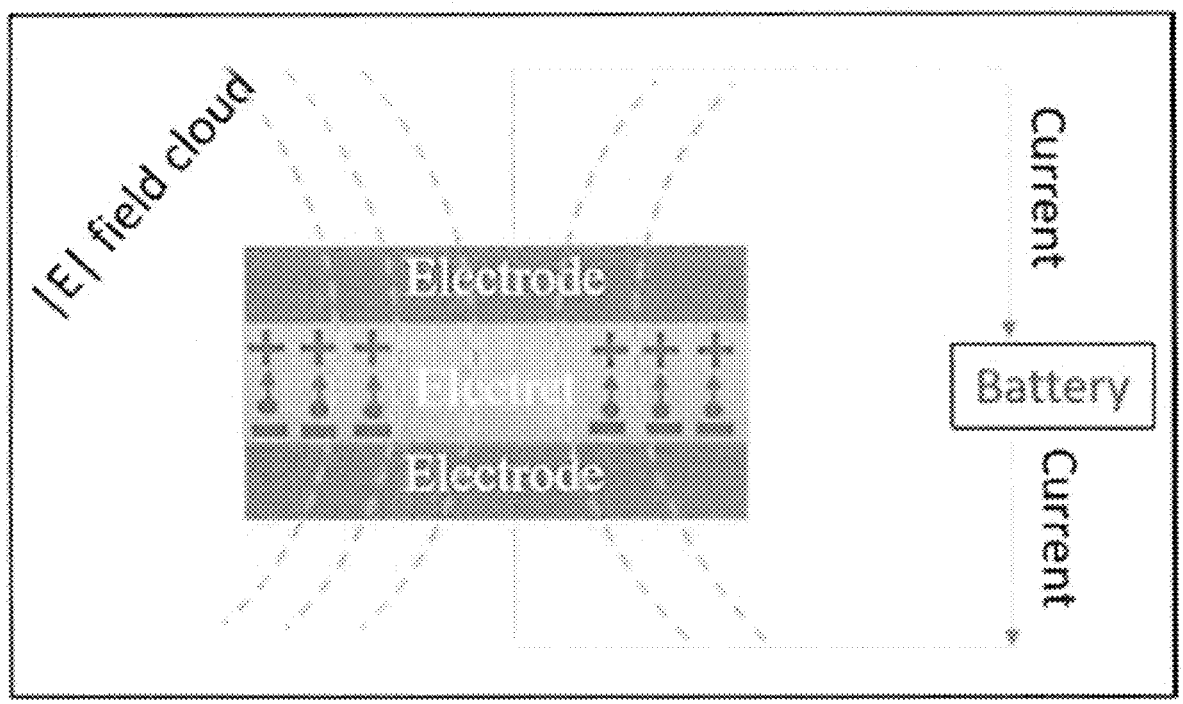

FIG. 14 shows an energy harvester arrangement according to an embodiment of the disclosure.

DETAILED DESCRIPTION OF THE INVENTION

The present disclosure is directed to systems, materials, methods and computer program products that can compute the electrical power density in geomaterials in the presence of subsurface clutter (e.g., wellbores) and engineered or natural geologic features whose EM properties (e.g., conductivity, permittivity, and permeability) are modified through the emplacement of an engineered or natural contrast agent (e.g., a solid, liquid, gaseous substance that has EM properties that are distinguishable from that of the host rock or engineered geosystem). In an embodiment, the contrast agents and additives can consist of mixture of materials with various EM properties. In an embodiment, the methods and computer program products can compute power density in the geomaterial and connected clutter, thus quantifying available energy for power harvesting, which in turn informs design and deployment of the wireless subsurface sensors.

The process of calculating power density is to create a geo-electric model that represents the subsurface engineered environment that may contain complex fracture-wellbore scenarios. To represent realistic features, such a model can be informed using field data from sources such as field mapping, seismic imaging, well logging, and other standard subsurface data collection techniques. The geo-electric model must contain geoelectrical heterogeneity such as fractures and clutter (e.g., infrastructure such as wellbores), which is to be represented at a wide range of length scales. Hierarchical finite element methods (Hi-FEM) are used to calculate the three-dimensional (3D) power density distribution as these methods account for 3D bulk electrical conductivity distributions and local conductivities that are defined on 1D linear features are features and 2D planar features such as fractures, all within a 3D unstructured mesh composed of tetrahedra, facets, edges, and vertices. Electrical properties are introduced onto tetrahedra, facets, edges, and vertices as needed to represent bulk, planar, linear, or point material properties or sources of electrical energy. If Hi-FEM approaches are not used, then classical volume-based electrical conductivity methods can be used that may involve mesh refinement to properly represent geoelectrical heterogeneity at multiple length scales.

Furthermore, the geo-electrical modeling calculates available power by first computing the scalar electrical potential for the geo-electrical model of the subsurface engineered environment and then the electrical field as the gradient of the potential that is computed. The power available for energy harvesting by a wireless sensor is the square of the magnitude of the electric field multiplied by the electrical conductivity function. This power density is in units of $W/m_3$. The power density represents not just bulk volume geo-electric response but features such as fractures and well casing. The result of the calculations indicates the characteristic spatial pattern of power density that will have different values in the near wellbore environment, or at fracture tips, or for a set of fractures, or for a variety of other potential configurations and features. The main result is that power density is quantified for the scenarios, which in turn enables planning of sensor design with inductive or capacitive methods for power harvesting or sensor placement planning to be optimized to the spatially-varying distribution of available power density. These methods extend to quantifying the impact of placement of electrodes to energize the subsurface system such as at the well casing or directly within a fracture that may contain an EM contrast agent or highly conductive material.

Subsurface engineered environments are wide-ranging, encompassing cement of wellbores to engineered barrier material of nuclear waste storage sites, such as salt or bentonite, to hydraulic fractures of porous rock that may be filled with proppant, brine, and/or hydrocarbons. Real-time and long-term monitoring of such systems would enable assessment of performance, health, and/or eminent failure modes and mechanisms. In an embodiment of the disclosure, a system of distributed, embedded sensors are used to measure and relay the physicochemical state of subsurface engineered environments to a data acquisition system.

Sensor systems require a suite of components and capabilities, such that the sensors can measure, store and transmit data (e.g., pressure or temperature) while harvesting energy and storing power for sensor operation.

In an embodiment, the size of sensor systems may need to be on the order of single millimeters or less to be feasibly emplaced into parts of a system such as fractures. According to the disclosure, battery size can be minimized as the surrounding media is used to transmit energy to the sensors and/or batteries. Such recharging via guide-material (i.e., contrast agents) facilitates long-term monitoring as the sensors can be recharged upon demand. The system includes robust communication such that sensor systems may cascade transmission of data to each other from a location of interest and across several meters of rock, wire or other materials to a central data acquisition system in a wellbore or other location.

In an embodiment, the size of sensor systems may need to be on the order of single centimeters or less to be feasibly emplaced into parts of a system into cement.

According to this disclosure, robust in situ power harvesting enables embedded wireless sensors to monitor the physicochemical state of subsurface engineered structures and environments. Electromagnetic (EM) contrast agents in hydraulically fractured reservoirs or in cement, in coordination with energized wells or power generation units, transmits energy to remotely charge distributed sensors to sense the physicochemical state of subsurface engineered structures and environments, such as, but not limited to temperature, pressure, pH, salinity, resistivity, interrogating fracture width, extent, and fracture-stage cross-communication, as well as cement integrity.

In another embodiment, numerical modeling is used to determine the EM characteristics of a subsurface system that is based on a highly instrumented field observatory. Those field scenarios can incorporate geometry and material properties of contrast agents, the wellbore, and the surrounding geologic environment to estimate volumetric power density near the wellbore and within hydraulic fractures. Geomaterials and engineered subsurface environments are wide ranging, encompassing cement of wellbores, engineered barrier material of nuclear waste storage sites such as salt or bentonite, and hydraulic fractures of porous rock that may be filled with proppants, brine, and hydrocarbons. Power density estimates are in turn used to inform design of electronic sensors that would harvest the available power using power transconduction devices to make measurements. The numerical modeling results indicate that the highest power densities are mainly focused around the wellbore excited by a point current source and the fracture boundary. Using Direct Current (DC) excitation, the highest power density in the fracture is at the fracture tip. The relatively high power density on the order of tens of mW/m³ at the vicinity of the wellbore and at fracture tips suggests that remote charging of sensor devices may be readily possible. Simulation results also show that the region of the highest power density can be significantly increased when the EM source is located inside a conductive fracture. The enhanced power density suggests that power density estimates could may be used to design embedded electronic sensors to harvest the contrast agent-assisted power-augmentation using power transconduction modules and enable long-term measurements in the subsurface without the need to retrieve and recharge sensors.

According to an embodiment of the disclosure, a power transmission channel is formed by an injected or otherwise embedded EM contrast agent combined with power harvesting devices having a rechargeable high temperature micro-battery. Such as system can enable reasonable operating lifetimes for sensor micro-systems in the subsurface on the order of months to years. These systems can measure parameters such as temperature, pressure or other sensed conditions, and can store measurements to memory and/or transmit this data wirelessly. In an embodiment, such a system requires power harvesting levels of several milliwatts for embedded application operation lifetimes. In various embodiments, the existing steel cased well, available electrical tomography resistivity electrodes, outside of steel or non-steel cased wells, or probing/validation wells on or near the surface may be used to energize the contrast agent and/or fractures. In another embodiment, the EM contrast agent is emplaced in either cement, fracture or both to work in concert with either existing steel cased well, electrical tomography resistivity electrodes, outside-of-observation wells, or probing/validation wells or on or near the surface to energize the EM contrast agent, sensors and/or cement.

In another embodiment, the EM contrast agent is used in concert with embedded micro-sensors in cement and/or fracture to map the extent (X-Y and azimuth) of propped fracture network.

The sensor design strongly depends on quantifying distributed power density for realistic fracture reservoir and wellbore scenarios. As such, the present disclosure also presents a methodology for determining available power/energy for wireless underground sensors by determining the available power in the subsurface due to DC or AC sources and to create a framework for determining the deployment strategy for charging. Numerical modeling of electrostatic characteristics are used to calculate power density of scenarios based on a real field site. Various fracture geometric parameters as well as a range of values for electrical properties of various components of the field site system, such as the contrast agents and the external source location, are used to evaluate controls on power density. The distributions of available power in the 3D geologic media are used to assess optimal sensor placement and sensor designs that would harvest the available energy.

Modeling Power Density in Geologic Media

The design of wireless underground sensors requires a careful assessment of the available power in the subsurface for in situ power harvesting. The numerical models used in that assessment must reflect the realism of complex fracture-wellbore scenarios. Given an earth conductivity model that contains geoelectrical heterogeneity, such as fractures and infrastructure such as wellbores possessing a wide range of length scales, the explicit definition of these geologic features and man-made structures in the model via classical volume-based electrical conductivity imposes high computational cost due to the extensive mesh refinement. To overcome this challenge, Hierarchical finite element method (Hi-FEM) is used to model power density distribution in 3D conducting media. The Hi-FEM accounts for the electrical responses due to not only 3D bulk electrical conductivity distributions, but also local anomalous conductivities defined on 1D linear and 2D planar features in a 3D unstructured mesh that is formed by tetrahedra, facets, and edges. The electrical properties of a 2D facet and a 1D edge are introduced into the finite element solution in forms of conductivity-thickness product (S, conductance) and the product of conductivity and cross-sectional area (S·m), respectively. Due to the composite definition of electrical conductivity, surface-like and linear-like structures at scales many orders of magnitude less than the field scale of interest can be expressed without the need for extreme mesh refinement by simply approximating them as connected facets and connected edges.

To model the available power, the scalar electric potential ($\phi$) in the geologic media is computed and then obtain the electric field as the gradient of the potential ($E=-\nabla\phi$). Poisson's equation governs the electric potential $\phi$ due to an electric current source in the electrostatic (DC) limit:

$$-\nabla\cdot(\sigma\nabla\phi)=\nabla\cdot J_s \qquad (1)$$

where $J_s$ is the steady electric current density of the source, and a is the electrical conductivity function.

Power can be delivered to embedded sensors inductively or capacitively. Either way, the EM fields will decay faster away from the source at higher frequencies, due to the skin depth effect. Therefore, the electrostatic limit can be considered the best case scenario for delivering power at distance, in the sense that the EM fields will decay less than any AC case. The amount of power that a sensor can harvest depends on the sensor's properties and harvesting mechanism, as well as the EM fields. Here, we model the electric field, and investigate the effect of the properties of the fracture on the resulting electric field. For any EM energy harvesting mechanism, the power available from an EM field depends on the square of the field magnitude. Numerical results are presented in terms of the square of the magnitude of the electric field ($|E|^2$). In addition, the volumetric power density profiles are also considered along fractures as well as well casings, $$P_d=\sigma|E|^2 \qquad (2)$$

The power density is a measure of the power dissipated as heat per unit volume, with units of W/m³. In a homogeneous host medium surrounding structures with uniform electrical conductivity, the power density exhibits the same distribution as the $|E|^2$, possessing amplitudes scaled by electrical conductivity. In the following sections, we use power density and $|E|^2$ interchangeably while describing their distributions.

Base Model: Single Fracture-Single Well-Casing

To study the power density distribution in a realistic setting, we construct an electrical conductivity model based on a highly instrumented field observatory called the Devine Geophysical Test Site, west of Devine, Texas managed by the Bureau of Economic Geology of the University of Texas at Austin. The field site includes a single steel-cased wellbore and an EM-excitable elliptical fracture 54 m below the surface, centered on the wellbore, which has already been mapped by geophysical methods. Modeling parameters for the casing depth, fracture parameters, and electrical conductivities are chosen to emulate the field site.

FIG. 1 shows details of a tetrahedral mesh at the wellbore according to an embodiment of the disclosure. The front face of this and all following details is a cross-section centered at the wellbore. The red dot shows the location of the 1 A point current source at the well head. The vertical black line marks the edges that represent the wellbore and casing. The facets that represent the fracture are shown in red. The piece of the mesh shown here is a cube, 100 m to a side. The full mesh extends 10 km in each horizontal direction, and 5 km below the surface. All cross-sections in following figures show the same region.

The well head is located at the origin of a tetrahedral mesh (FIG. 1). The 81 m deep vertical casing has an outer diameter of 0.1143 m, and a casing wall thickness of 0.00569 m. Using the Hi-FEM, the well casing is represented as a series of connected vertical edges in the finite element mesh. Each of these edges is assigned a conductivity-area product of 1941.34 Sm, based on a conductivity of 106 S/m for steel and ignoring the effect of the interior of the well. The Hi-FEM allows us to represent the fracture as a series of facets in the shape of an ellipse in the mesh. The major axis of the ellipse is 29.6 m, and the minor axis is 23.3 m. The fracture is considered to be uniformly 0.0048 m thick. It is postulated that the EM contrast agents act as conduit for channeling power to micro-sensors. Representing the conductivity of a fracture filled with brine and a highly conductive contrast agent, the conductivity of the fracture is defined as 500 S/m. Since the conductance is the product of conductivity with thickness, these values yield a fracture conductance of 2.4 S. The host rock is assigned a uniform conductivity of 0.05 S/m.

To satisfy the homogeneous Dirichlet boundary condition at the edges and the homogeneous Neumann boundary condition on the air-earth interface, we use a large computational volume of 10×10×5 km. We generate tetrahedral meshes using CUBIT. The mesh contains 910,340 tetrahedra. 1,630 connected facets are used to define the fracture, and 81 connected edges are used to define the wellbore (FIG. 1). We note that the classical finite element analysis would require millions of tetrahedra to capture features on the scale of the fracture thickness and the well casing thickness. A direct current source of 1 A at the well head energizes the well bore-fracture system.

Modeling Results

In order to inform the design of embedded underground wireless sensors network, the power density gradient is modeled for both near wellbore and fracture environments in the presence of EM contrast agents. The power density distribution depends on the fracture geometry, fracture electrical conductivity, and power source location. These parameters are varied to assess their effects on the available power for underground sensors. These results are compared against the base model described in the previous section.

A. Contrast in Electrical Conductivity

Hydraulically conductive fractures generally present a significant contrast in electrical conductivity in comparison to the surrounding geologic medium. Fractures can be manipulated by EM-excitable contrast agents to act as a more electrically conductive or electromagnetically active target for detection. To investigate the effects of the conductivity contrast on the power density distribution, we consider three models (including the base model) were considered with different contrasts in electrical conductivity. All other parameters are kept the same with the base model except the fracture electrical conductivity. The fracture conductivities are defined as 5000, 500 and 50 S/m in background conductivity of 0.05 S/m, which corresponds to relative contrast of 5, 4 and 3 in $\log_{10}$ space (see FIGS. 2A-F).

Referencing FIGS. 2A-F, FIGS. 2A, 2B, 2C show cross-sectional views of the scalar electric potential ($\varphi$) and FIGS. 2D, 2E, 2F show the square of the magnitude of the electric field $|E|^2$ for different conductivity contrasts between the fracture and the host rock. The size of each volume is 100 m³. Relative electrical conductivity contrasts of 103, 104, and 105 with respect to a 0.05 S/m host medium are modeled. In these models, a 1 A DC current source energizes the steel casing at the well head, as in FIG. 1. The horizontal bold black line represents the cross-section of the fracture. The color map was chosen to make it easy to see changes in $|E|^2$. The actual minimum and maximum values for each model are given below the plot.

Referencing FIGS. 2A, 2B, 2C, the distribution of the electrostatic scalar potentials indicate the highest gradients near the well casing and the fracture tips. Accordingly, the $|E|^2$ for all models show the highest electric field corresponding to these areas. The strength of the volumetric power density decays away from the well casing and show anomalously high strength overlapping with the fracture tips. Fracture conductivity strongly affects the amplitude of the distribution of $|E|^2$, as can be seen in FIGS. 2D, 2E, 2F.

FIG. 3A shows the volumetric power density for different fracture conductivity contrasts with the host rock along the wellbore and FIG. 3B shows the volumetric power density for different fracture conductivity contrasts with the host rock along the major axis of the fracture, which is 29.6 m. Along the well casing, the volumetric power density drastically drops at the fracture depth FIG. 3A. The drop in the level of the power depends on the conductivity contrast. The highest power above the fracture depth and the lowest power below the fracture depth result from the highest conductivity contrast. Moreover, changing the fracture conductivity controls the field strength within the fracture, especially at the fracture tips, as seen in FIG. 3B. As the conductivity contrast increases, the field becomes stronger near the fracture tips. FIG. 3B reinforces the effect seen in FIGS. 2A-F, increasing the fracture conductivity redistributes power towards the fracture tips.

Fracture Size

The characteristics of fractures may change through time during the engineering operations in conventional as well as tight unconventional oil and gas reservoirs. Therefore, the evaluation of the effects of the fracture parameters on the power density distribution is crucial for a suitable sensor design that can ensure to power the embedded wireless sensors under time-varying fracture conditions. Particularly, we examine the effect of the fracture size on the power density. The fracture models with half and double fracture sizes in comparison to the fracture size of the base model are considered FIGS. 4A, 4B, 4C). For a consistent comparison, all other parameters are kept the same as in the base model.

FIGS. 4A, 4B, 4C show cross-sectional views of $|E|^2$ for different fracture sizes. Each volume is 100 m³. The horizontal bold black line represents the cross-section of each fracture. The source is at the well head as in FIG. 1. R above each plot represents the size of the fracture ellipse of the base model. Maximum and minimum values of $|E|^2$ are shown below each plot. FIG. 4A shows a fracture with major and minor axes that are half the size of the base case. FIG. 4B shows a base case fracture size. FIG. 4C shows a fracture with major and minor axes that are twice the size of the base case. As can be seen in FIGS. 4A, 4B and 4C, $|E|^2$ is dependent on fracture size. All models present the same pattern for the power density distribution; however, the magnitude of the power density is strongly controlled by the fracture size.

FIGS. 5A and 5B show volumetric power density profiles for different fracture sizes. FIG. 5A shows power density along the wellbore and FIG. 5B shows power density along the major axis of each fracture. The volumetric power density profiles along the well casing indicate that the longer fracture size has the same effect with the higher conductivity contrast on the decrease in power at fracture depth (FIG. 5A). Moreover, the profiles at the fracture depth show that the volumetric power density decays more rapidly away from the well casing for smaller fracture sizes; thus, less power is available within the fracture (FIG. 5B). On the other hand, as the fracture size increases, the power density at fracture tips becomes weaker.

Fracture Orientation

In addition to the fracture size, the effect of fracture orientation is also examined. Three different fracture orientations (fracture dip angle) are considered along the major fracture axes: 0° (horizontal), 45° and 75°. All other model parameters are the same as those of the base model.

FIGS. 6A, 6B, 6C show cross-sectional views and slices of $|E|^2$ for a horizontal fracture (see FIG. 6A), a fracture plane at a 45° angle with horizontal (see FIG. 6B), and a fracture plane at a 75° angle with horizontal (see FIG. 6C). The size of each volume is 100 m$^3$. The bold black line in each plot represents the cross-section of each fracture. The bottom panels show the corresponding slices taken in the plane of the fracture. A and A' in each cross-section matches A and A' in the corresponding plan view. The fracture is outlined in these slices (in black). Each slice view is centered on the wellbore and extends 60 m away from it in each direction.

As can be seen in FIGS. 6A, 6B and 6C, the fracture orientation is relative to the well casing that is used as a long electrode excited by a current source located at the surface controls both the overall distribution and the strength of $|E|^2$. The varying fracture orientation results in significantly different $|E|^2$ distributions in both the host medium and the fracture (see bottom panels of FIGS. 6A, 6B, 6C). While the horizontal fracture results in a symmetric $|E|^2$ distribution along the fracture, the increase in the fracture dip angle results in elongated distributions towards to the tip of the fracture near the surface. Moreover, while the power density profiles along the fracture presents a strong dependence on the fracture orientation, the profiles along the well casing show no dependence suggesting that the power density is distributed from the well casing to differently-oriented fractures in the same amount unless they have different conductivities. In comparison to the power density of the horizontal fracture model that shows a symmetric power density along the fracture, the power density does not show anomalously high values at the shallow fracture tip and is higher in the host medium on this side of the fracture (see FIGS. 7A and 7B). FIGS. 7A and 7B shows volumetric power density profiles for varying fracture dip angle. FIG. 7A shows power density along the wellbore and FIG. 7B shows power density along the major axis of each fracture. The steepest fracture model results in the highest power density along the fracture and the lowest density at the deeper fracture tip. As a result, the fracture orientation strongly controls the available power for the wireless sensors embedded within fractures. Depending on the angle between the fracture plane and the well casing, the power may not be equally distributed within the fracture.

Regularly-Spaced Fractures

FIG. 8 shows cross-sectional view of $|E|^2$ in the presence of five regularly-spaced fractures. A 100 m$^3$ volume is shown. Horizontal black lines with 5 m spacing represent cross-sections of equally-sized fracture ellipses. The DC current source is at the well head, as in FIG. 1. In fractured environments, fluid flow likely occurs within a group of fractures rather than a single fracture. For a more realistic fractured medium simulation, we consider a regularly spaced, multi-fracture model to complete our analyses regarding the effects of fracture properties. The multi-fracture model is a modified version of the base model that has four additional fractures at greater depths with 5 m spacing (see FIG. 8). The additional fractures have the same properties with the existing fracture. The resulting $|E|^2$ distribution is examined to better understand the available power conditions in the host medium as well as within and the zones between the adjacent fractures.

As can be seen in FIG. 8, the power density concentrates at each fracture tip as in the single fracture model. However, bounded above and below by the first and last fracture, a dead zone appears where the host medium has very low power density and the power density decays more rapidly away from the well casing. In addition, the host medium has higher power density in the area below the last fracture in comparison to the area above the first fracture. Also, the overall maximum power density of the multi-fracture model is lower than the single fracture model.

FIG. 9A shows that at each fracture location, the power density drops gradually; at deeper fractures, the level of the drop increases. Moreover, the profiles at fracture depths show an interesting result that the power density does not decrease at the fracture tips at greater depths. Also, although the deepest fracture has the most power, and the shallowest fracture has the second-most power density; the amplitude of power density does not show a significant change within the fractures (FIG. 9B). This indicates that the power density will be distributed through the fractures almost equally regardless of the number and the depth of the fractures. The gradual drops of the level of the power density at fracture depths along the well casing (FIG. 9A) supports this phenomenon: the power density at the well casing will drop more so that the same amount of power density can be distributed through the fractures.

Power Source Location

FIG. 10A shows cross-sectional views and plan views of $|E|^2$ when the source is at the depth of the fracture, located in the borehole. FIG. 10B shows cross-sectional views and plan views of $|E|^2$ when the source is at the depth of the fracture, located midway between borehole and the fracture tip. FIG. 10C shows cross-sectional views and plan views of $|E|^2$ when the source is at the depth of the fracture, located at fracture tip. The source is denoted by a white dot. Every view remains centered on the wellbore. In cross-sectional views, horizontal black lines denote cross-sections of the fracture. The bottom panels show the corresponding plan views at the fracture depth where the fracture is outlined in black.

There are two reasons to model cases where the source is at the fracture depth. First, an electrode could be placed in the wellbore to deliver more power into the fracture through the direct excitation of the steel well casing (FIG. 10A). Second, sensors embedded within the fracture could transmit power between each other, from one to the next by the excitation of the conductive fracture (FIGS. 10B and 10C).

For the case where the source is located in the wellbore at fracture depth, the resulting $|E|^2$ distribution appears similar to the distribution due to a source at the surface (FIG. 3A) which has slightly higher maximum value of the $|E|^2$ than the base model. On the other hand, the plan views in FIGS.

10A, 10B, 10C show significantly different distributions for two cases and that moving the source into the fracture results in more power available.

In comparison to the base model response, FIG. 3A shows that the power distribution along the well casing changes significantly when the source is placed at the fracture depth.

FIGS. 11A and 11B show profiles of volumetric power density for source locations at the fracture depth along the wellbore and along the fracture's major axis, respectively. The profiles along the well casing show anomalously lower power density at the fracture depth, and not surprisingly, the highest power density along the well casing when the source is directly connected to the well casing (FIG. 11A). The profiles indicate that the power density along the well casing is affected by the distance from the source to the well casing. Further, the profiles at fracture depth (FIG. 11B) show that the power density is distributed symmetrically within the fracture whereas the power density is dominantly higher in the half part of the fracture where the source is located and is blocked by the well casing for the other half resulting in even lower power density than the case the source is located at the well casing.

The present disclosure is further directed to robust systems and methods for in situ monitoring of subsurface engineered systems. The systems include a network of wireless autonomous sensors that are embedded in a system and able to relay the physicochemical state of one or more properties or characteristics of the system to a real-time, near real-time or delay data acquisition system. The sensors and/or sensor networks may include, but are not limited to integrated control circuits, memory, power storage devices, battery recharging devices, communication devices, and harsh environment packaging. In an embodiment sensor and/or sensor components are on the order of single millimeters or less to facilitate sensor emplacement into subsurface fractures and/or wellbore cement. The constrained size requires small batteries, which limits battery life, so remote charging by the disclosed methods enables monitoring to proceed beyond the time-scale of the initial charge.

Another embodiment of the invention is directed to a computer system that executes instructions for determining the system parameters necessary for energizing and conducting the disclosed method. The system includes computer hardware, software and firmware capable of executing instructions that perform the disclosed processes. Such instructions may be embedded on a non-transitory storage medium, such as a hard drive or server.

FIGS. 12 and 13 illustrate a sensor system 100 according to an embodiment of the disclosure. As can be seen in FIG. 12, the sensor system includes a plurality of sensors 107 disposed in and proximate to a geologic formation 106. The geologic formation 106 includes a surface 104 and factures 118 and a well bore 102 and casing 108 that may include an outer cement casing layer 110 that resulted from the use of drilling and extraction equipment 134.

The sensor system 100 includes an electrical source 112, an EM contrast agent 105, which in this exemplary embodiment is a combination of a carrier fluid 105, and a plurality of EM or electrically conductive proppants 123 disposed within the fractures 118 or cement casing 108, a plurality of autonomous microsensors 107 also disposed within the fractures 118 or cement casing 108, receivers 128 for receiving information transmitted from the microsensors 107, receivers 128 in wellbore, wired to surface, and a control unit 129 for recording, storing and analyzing the information. The control unit 129 includes, but is not limited to the computing equipment 132, power source 112, receivers 128, and a data recording system 130.

In this exemplary embodiment, the electrical source 112 is a DC power source that is grounded 124 to the formation 106. The electrical source 112 includes a source to formation contact device 116 located down the borehole 102 and proximate to the fractures 118. In other embodiments, the electrical contact device 116 may consist of one or more partially buried electrode inserted on surface of the ground. In other embodiments, the electrical source 112 may be an AC power source and may include an energized well casing or may connect via a formation contact device. In other embodiments, the electrical source 112 may be a pulsed DC power source and may or may not energized the well casing or may connect via a formation contact device. In other embodiments, the electrical source 112 may be a quasi-static AC power source and may include an energized well casing or may connect via a formation contact device.

In this exemplary embodiment, two receivers L1, L2 are located on the surface 104. In other embodiments, one or more receivers 128 may be located down the borehole and/or on the surface. For example, the receivers may include one or more antennas disposed down the borehole 102 and wired to surface. In other embodiments, one or more receivers 128 may be located down the borehole and on or near surface.

In this exemplary embodiment, the contrast agent medium includes a flow medium 105, a conductive proppant 123 and autonomous microsensors 107 disposed in the fractures 118. The flow medium 105 may be fracking fluid, hydrocarbons, water/brine an engineered carrier fluid with or without enhanced EM property or combinations thereof. The EM contrast agent additive, fluids and/or proppant 123 may be, but not limited to, metal ion impregnated proppant that includes EM metamaterials, silica, polymers, resins, alloys, graphite, magnetite, pyrite bauxite or other engineered proppant materials; such as, composites, ceramic, metal, alloys or graphitic proppants, and/or electromagnetic nanoparticles, micro particle additives, such as, but not limited to Carbon Nano Tube (CNT). Multiwall Nano Tube (MWNT), graphene, magnetite, Perm-alloys, Titanium Nano tube (TiNT) or combinations thereof.

The autonomous microsensors (hereinafter referred to as microsensors) 107 are sensor devices that are capable of sensing a physical, mechanical, chemical parameter or combination of parameters and transmitting those parameters. In addition, the microsensors 107 are capable of being electrically powered or charged by DC, quasi-static AC, AC or pulsed-DC or magnetism that flows from the electrical source 112 into the contrast agent 105 to the microsensors 107. The amount of power required from the electrical source to power and/or charge the microsensors 107 is determined by the process described earlier in this disclosure.

As such, the microsensors embedded in the subsurface are able to relay the physicochemical state of the system via electromagnetic waves 122 to a data acquisition system. The data acquisition may occur in real time, near-real-time or at a time post energizing of the sensors or at a time post energizing of the sensors. The data acquisition may be on the surface or sub-surface. The microsensors include key components, such as, but not limited to integrated microcontroller; memory; power storage devices; power harvesting devices; communication devices; sensing devices, and harsh environment packaging (see FIG. 13). Size constraints are on the order of single millimeters or centimeters or less to facilitate sensor emplacement into subsurface fractures and/ or wellbore cement, respectively. The constrained size limits the available memory and power storage size. Remote charging enables monitoring to proceed beyond the timescale of the power storage devices. Communication and power signals are propagated in the cement and/or fractures by EM additives to a source/receiver in the wellbore or on surface.

In another embodiment, microsensors may be embedded into the engineered geologic system through cement or other materials (e.g., composites) that are injected into the annular space between the wellbore casing (e.g., steel casing) and the surrounding host rock, 108 in addition to or in place of the contrast agents in fractures 118. In the context of contrast agents in the annular space, contrast agents would be an additive that modifies its EM properties to improve energy transmission to the embedded sensors. One or more types of microsensors 107 may be used. For example, microsensors for measuring stress/strain may be included in the cement of the casing 108 and/or pressure, temperature and/or pH microsensors may be disposed in the fractures 118.

The computation of the electrical power density and the inputs/assumptions made in the contrast agents and sensors, in an embodiment, can be used to determine the selection and placement of said components in the actual application of the system in a real world application.

FIG. 14 illustrates an energy harvester according to an embodiment of the disclosure. The energy harvester is a component of a microsensor. The energy harvester has available to it the DC power density in the subsurface as estimated above. The harvester provides the received energy to the microsensors or a component, such as a battery, of the microsensors. The energy can be harvested through electret, a dielectric material that has a quasi-permanent electric charge or dipole polarization-based electrostatic converter. Generally, in electrostatic energy harvesting, charges are developed by the vibrational or mechanical energy, which can be stored by capacitive methods. However, in this case charges are already present in the wellbore, which can readily be stored by using electret-based electrostatic converters. In the downhole environment, positive and negative charges are present through the electric field, which can be separated through the unidirectional dipole of the material; that is, positive charges will accumulate on one side of electret surface whereas negative charges will accumulate on the other side as shown in FIG. 14. Upon charge injection there is a surface potential Vs that develops on the electret and its potential can be expressed as $$V_s = Ed \quad (5)$$

where E is the electric field, d is its thickness. This electret layer model can be interpreted as a capacitor $$C = \varepsilon_r \varepsilon_0 A/d \quad (6)$$

where A is an area of the capacitor. In this capacitive harvesting, the variation in the capacitance is results from the relative permittivity or dielectric constant of electret, which is changed by the injection of charges, whereas A and d in the above expression are constants. In order to have high stability of electret-based converters, strong dielectric strengths are required to align the dipole. Stability and loss determine how long the charges are accumulated in the electrets. Silicon dioxide is one such electret which is highly stable and can keep charge for a longer duration. In an embodiment, possible energy that can be harvested from near wellbore was calculated using an EM field of 0.22 V/m at the fracture boundary using a silicon dioxide-based electret capacitor. By considering a modelled capacitor system (d=3 μm, L=3 mm, b=3 mm; A=bL=9 mm$^2$) based on SiO2 electret ($\varepsilon_r$=3.9; $\varepsilon_0$=8.8510-12 F/m), surface voltage of electret is calculated using Eq. (5) as Vs=0.66 μV. Stack value of capacitors (thickness is ~1 mm) from Eq. (6) is calculated to be C=10.62 nF. Power output from the capacitor for every 10 micro seconds is 2.34 fW. Therefore, a current of 3.6 nA and voltage of 0.65 μV is provided every 10 microseconds.

The invention being thus described, it will be obvious that the same may be varied in many ways. Such variations are not to be regarded as a departure from the spirit and scope of the invention, and all such modifications, as would be obvious to one skilled in the art, are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure.

What is claimed is:

1. A process, comprising:
 disposing a plurality of microsensors in a subterranean fracture of a subterranean formation;
 computing electrical power density in the subterranean formation;
 wirelessly providing power to the plurality of microsensors by one or more elements located at a distance from the plurality of microsensors;
 sensing one or more physicochemical states by the plurality of microsensors;
 transmitting data of the one or more physicochemical states from the plurality of microsensors to a receiver; and
 analyzing the transmitted data;
 wherein a factor in determining the provided power is the electrical power density.

2. The process of claim 1, wherein the plurality of microsensors comprise energy harvesting modules that receive energy from an electrical source.

3. The process of claim 1, wherein energy is transmitted to wirelessly energize the plurality of microsensors through a contrast agent.

4. The process of claim 3, wherein the contrast agent comprises a conductive proppant.

5. The process of claim 1, wherein the plurality of microsensors are disposed in the subterranean fracture in a fracking fluid.

6. The process of claim 1, wherein the one or more elements are selected from the group consisting essentially of a transmitter, a wellbore, a clutter, a cement, an electromagnetic (EM) contrast agent, and an EM media modifier.

7. A method for monitoring one or more physicochemical states, comprising:
 determining an amount of power necessary to power a plurality of microsensors disposed within a subterranean formation in the presence of a contrast agent;
 disposing the microsensors and contrast agent within the subterranean formation;
 powering the microsensors by a wireless power transmission from a power transmitter located at a distance from the microsensors;

measuring one or more physicochemical states and transmitting the one or more measured physicochemical states;

receiving the one or more measured transmitted physicochemical states; and analyzing the received one or more physicochemical states to compile the one or more physicochemical states within the subterranean formation;

wherein a factor in determining the amount of power necessary includes determining an electrical power density of the subterranean formation in the presence of the contrast agent.

8. The method of claim 7, wherein determining the amount of power includes determining a proximate charge to an energy harvesting module that is part of the microsensors necessary to power or charge the microsensors.

9. The method of claim 7, wherein determining the amount of power includes determining a power profile within the contrast agent.

10. The method of claim 7, wherein the received one or more measured physicochemical states are received via an antenna disposed in the subterranean formation.

11. The method of claim 7, wherein the contrast agent is used in concert with embedded microsensors in fractures to map an extent of a fracture network.

\* \* \* \* \*